United States Patent
Lewin et al.

(10) Patent No.: US 7,465,231 B2
(45) Date of Patent: Dec. 16, 2008

(54) SYSTEMS AND METHODS FOR DELIVERING CONTENT OVER A NETWORK

(75) Inventors: Blake P. Lewin, Lilburn, GA (US); Eric Diez, Atlanta, GA (US)

(73) Assignee: Gametap LLC, Paris (FR)

( * ) Notice: Subject to any disclaimer, the term of this patent is extended or adjusted under 35 U.S.C. 154(b) by 726 days.

(21) Appl. No.: 10/850,899

(22) Filed: May 20, 2004

(65) Prior Publication Data

US 2005/0261062 A1 Nov. 24, 2005

(51) Int. Cl.
*A63F 13/00* (2006.01)

(52) U.S. Cl. .............................. 463/37; 463/29; 463/30; 463/31; 463/32; 463/33; 463/34; 463/39; 463/40; 463/41; 463/42

(58) Field of Classification Search ............. 463/29–34, 463/37, 39–42
See application file for complete search history.

(56) References Cited

U.S. PATENT DOCUMENTS

| | | | |
|---|---|---|---|
| 5,251,909 A | 10/1993 | Reed et al. | |
| 5,762,552 A | 6/1998 | Vuong et al. | |
| 5,768,382 A * | 6/1998 | Schneier et al. | 380/251 |
| 5,827,120 A | 10/1998 | Kikuchi et al. | |
| 5,851,149 A * | 12/1998 | Xidos et al. | 463/42 |
| 5,944,608 A * | 8/1999 | Reed et al. | 463/40 |
| 6,012,984 A | 1/2000 | Roseman | |
| 6,024,643 A | 2/2000 | Begis | |
| 6,073,124 A | 6/2000 | Krishnan et al. | |
| 6,126,546 A | 10/2000 | Reed et al. | |
| 6,215,498 B1 | 4/2001 | Filo et al. | |
| 6,227,974 B1 | 5/2001 | Eilat et al. | |
| 6,266,774 B1 * | 7/2001 | Sampath et al. | 726/24 |
| 6,343,315 B1 | 1/2002 | Stoel | |
| 6,346,048 B1 * | 2/2002 | Ogawa et al. | 463/42 |
| 6,358,150 B1 | 3/2002 | Mir et al. | |
| 6,385,150 B2 | 5/2002 | Asano | |
| 6,402,618 B1 | 6/2002 | Reed et al. | |
| 6,409,602 B1 | 6/2002 | Wiltshire et al. | |

(Continued)

FOREIGN PATENT DOCUMENTS

| WO | WO 00/48073 | 8/2000 |
|---|---|---|
| WO | WO 2004/036807 A2 | 4/2004 |

OTHER PUBLICATIONS

International Search Report for PCT/US2005/016366, dated Aug. 17, 2005.
W. Wayt Gibbs, *The Infinite Arcade Machine*, www.ScientificAmerican.com Sep. 15, 2003, pp. 1 and 2.
International Search Report and Written Opinion for PCT/US2005/016366, dated Oct. 19, 2005.

*Primary Examiner*—Robert E Pezzuto
*Assistant Examiner*—Adetokunbo Torimiro
(74) *Attorney, Agent, or Firm*—Darby & Darby P.C.

(57) ABSTRACT

A content delivery system that uses a graphical user interface and host avatar to introduce users to and allow them to select from available content. A game delivery system that uses emulators to execute software written to run on a plurality of game platforms. The systems include a scalable, dynamic interface that launches and manages emulators in a manner that is largely transparent to the user, and a combination of linear and on-demand content provides users with a managed gaming experience not unlike that of interactive television.

50 Claims, 10 Drawing Sheets

U.S. PATENT DOCUMENTS

| | | |
|---|---|---|
| 6,425,828 B2 | 7/2002 | Walker et al. |
| 6,468,160 B2 | 10/2002 | Elliot |
| 6,482,087 B1 | 11/2002 | Egozy et al. |
| 6,513,160 B2 | 1/2003 | Dureau |
| 6,539,400 B1 | 3/2003 | Bloomfield et al. |
| 6,544,126 B2 | 4/2003 | Sawano |
| 6,554,706 B2 | 4/2003 | Kim |
| 6,599,194 B1 | 7/2003 | Smith et al. |
| 6,645,077 B2 | 11/2003 | Rowe |
| 6,767,287 B1 | 7/2004 | Mcquaid |
| 6,769,989 B2 | 8/2004 | Smith et al. |
| 6,805,634 B1 | 10/2004 | Wells |
| 6,863,610 B2 | 3/2005 | Vancraeynest |
| 6,884,162 B2 | 4/2005 | Raverdy |
| 6,893,348 B2 | 5/2005 | Yamagami |
| 6,935,960 B2 | 8/2005 | Jändel |
| 6,945,870 B2 | 9/2005 | Gatto |
| 6,955,606 B2 | 10/2005 | Taho |
| 2001/0004609 A1 | 6/2001 | Walker et al. |
| 2001/0016519 A1 | 8/2001 | Choe |
| 2001/0024974 A1 | 9/2001 | Cohen |
| 2001/0029205 A1 | 10/2001 | Taho et al. |
| 2001/0031665 A1 | 10/2001 | Taho et al. |
| 2001/0036865 A1 | 11/2001 | Neal, III |
| 2002/0037767 A1 | 3/2002 | Ebin |
| 2002/0045484 A1* | 4/2002 | Eck et al. ............... 463/42 |
| 2002/0077177 A1 | 6/2002 | Elliott |
| 2002/0082087 A1 | 6/2002 | Kuroda |
| 2002/0090985 A1 | 7/2002 | Tochner |
| 2002/0105533 A1 | 8/2002 | Cristo |
| 2002/0113820 A1 | 8/2002 | Robinson et al. |
| 2002/0115489 A1 | 8/2002 | Jordan et al. |
| 2002/0132666 A1 | 9/2002 | Lind et al. |
| 2002/0138594 A1 | 9/2002 | Rowe |
| 2002/0142842 A1 | 10/2002 | Easley |
| 2003/0005439 A1* | 1/2003 | Rovira ............... 725/37 |
| 2003/0008712 A1* | 1/2003 | Poulin ............... 463/42 |
| 2003/0013527 A1 | 1/2003 | Rowe et al. |
| 2003/0045356 A1 | 3/2003 | Thomas |
| 2003/0114224 A1 | 6/2003 | Anttila et al. |
| 2003/0114226 A1 | 6/2003 | Kimura |
| 2003/0130040 A1 | 7/2003 | Dripps |
| 2003/0156134 A1* | 8/2003 | Kim ............... 345/753 |
| 2003/0162594 A1 | 8/2003 | Rowe |
| 2003/0171149 A1 | 9/2003 | Rothschild |
| 2003/0181242 A1 | 9/2003 | Lee et al. |
| 2003/0190960 A1 | 10/2003 | Jokipii et al. |
| 2003/0199313 A1 | 10/2003 | Gonen et al. |
| 2004/0002384 A1 | 1/2004 | Multerer |
| 2004/0002385 A1 | 1/2004 | Nguyen |
| 2004/0005928 A1 | 1/2004 | Eguchi |
| 2004/0043819 A1 | 3/2004 | Willis |
| 2004/0075677 A1 | 4/2004 | Loyall et al. |
| 2004/0097288 A1 | 5/2004 | Sloate |
| 2004/0110564 A1 | 6/2004 | Kern |
| 2004/0116186 A1 | 6/2004 | Shim |
| 2004/0147324 A1 | 7/2004 | Brown |
| 2004/0157664 A1 | 8/2004 | Link |
| 2004/0180721 A1 | 9/2004 | Rowe |
| 2004/0198496 A1 | 10/2004 | Gatto |
| 2004/0198498 A1 | 10/2004 | Yamashita |
| 2004/0209692 A1 | 10/2004 | Schober |
| 2004/0235563 A1 | 11/2004 | Blackburn |
| 2004/0235567 A1 | 11/2004 | Chatani |
| 2004/0237119 A1 | 11/2004 | Smith |
| 2004/0242325 A1 | 12/2004 | Levitan |
| 2004/0266529 A1 | 12/2004 | Chatani |
| 2004/0266533 A1 | 12/2004 | Gentles |
| 2004/0266534 A1 | 12/2004 | Byng |
| 2005/0026700 A1 | 2/2005 | Blanco |
| 2005/0037845 A1 | 2/2005 | Rozkin |
| 2005/0043097 A1 | 2/2005 | March |
| 2005/0044568 A1 | 2/2005 | White |
| 2005/0055309 A1* | 3/2005 | Williams et al. ............... 705/40 |
| 2005/0059492 A1 | 3/2005 | Hedin |

* cited by examiner

SYSTEMS AND METHODS FOR DELIVERING CONTENT OVER A NETWORK

FIELD OF THE INVENTION

The present invention relates generally to entertainment distribution systems and methods and specifically describes systems that deliver games to users over a network.

BACKGROUND

The U.S. entertainment software industry is almost a $7 billion a year industry, according to the most recent data released by the Interactive Digital Software Association (now the Entertainment Software Association). More than 221 million computer and video games are sold each year, which equates to almost two games for every household in America. The bulk of the entertainment software market share has historically been devoted to games written for personal computers. But in recent years the introduction of specialized video game consoles by companies such as Sony™, Microsoft™ and Nintendo™ has caused console software to capture a greater percentage of the market share.

Not surprisingly, the competition for the gaming dollar has been fierce. Every few years improved versions of the specialized gaming platforms are released, offering increased processing speeds and graphic capabilities. Soon after an improved version of a video game console is released, and many times even before the release, the companies that write the software for the consoles abandon the older console version and begin developing games for the newer console. While games are typically available for older gaming platforms, the bulk of new games that come to market are always written for the latest gaming systems.

Another aspect of the competition between manufacturers of gaming systems is the release of game content that is exclusive to a single game platform. One technique game manufacturers have used in recent years to build or maintain market share is to develop a game or a game series that is only available on the game system sold by that manufacturer. Games are often developed by companies that are independent of the game platform manufacturers, and these companies write games (or port them) so that the game can be played on a number of different systems. The advantage to the game developer, of course, is that by marketing a game to those gamers that own different gaming systems, the developer reaches a larger target audience. But the developer of an exclusive game has a slightly different motivation. Typically, a game that is developed or marketed for a single platform is purposely limited to that platform in an effort to convince consumers to buy the gaming system. Examples of exclusive game content include the Mario® series from Nintendo™ and Halo® from Microsoft™.

From the perspective of the gamer, the presence of multiple competing gaming systems and exclusive content written for each is both good and bad. On one hand, the competition between manufacturers forces them to strive to improve the capabilities of their respective gaming systems. But on the other hand, the presence of multiple, incompatible gaming systems, forces the gamer to choose between different sets of available games or, alternatively, requires that the gamer purchase two or more of the competing gaming systems. Between the cost of updating to the latest gaming platforms and the cost of the actual game software, it quickly becomes cost prohibitive for an enthusiast that wants to play games written for two or more incompatible gaming systems.

Emulation software (sometimes referred to herein as "emulators") arose, in part, as a response to a perceived need among gamers for a cross-platform gaming capability. Generally, a software emulator is a computer program that runs on a target platform (often a personal computer) and uses software to supply native platform capabilities that are not present in the target platform. For example, a software emulator written to emulate a Nintendo Game Boy® handheld device uses software to perform some or all of the specialized graphic functions that the Game Boy® device would normally perform. Similarly, the emulator uses software code to emulate the hardware configuration within the Game Boy® and translates the game software requests into requests that are handled by the hardware configuration of the target platform.

The benefit of emulators is that the application allows the gamer to play games on his or her system that were not originally written for that type of system. But a downside of emulators is that they are notoriously difficult to write (requiring a large amount of knowledge of the internal workings of the system that is being emulated) and even a well-written emulator will not emulate every game written for the emulated system. Another problem with emulators is the difficulty in making the emulator work properly with the hardware and software configurations of the platform on which the emulator is running.

An unsatisfied need therefore exists in the industry for new systems and methods of delivering game content to users that was written for different gaming platforms. A related need is for an interface that is user-friendly and manages the intricacies of emulating the various gaming platforms.

BRIEF DESCRIPTION OF THE DRAWINGS

Figure 1:
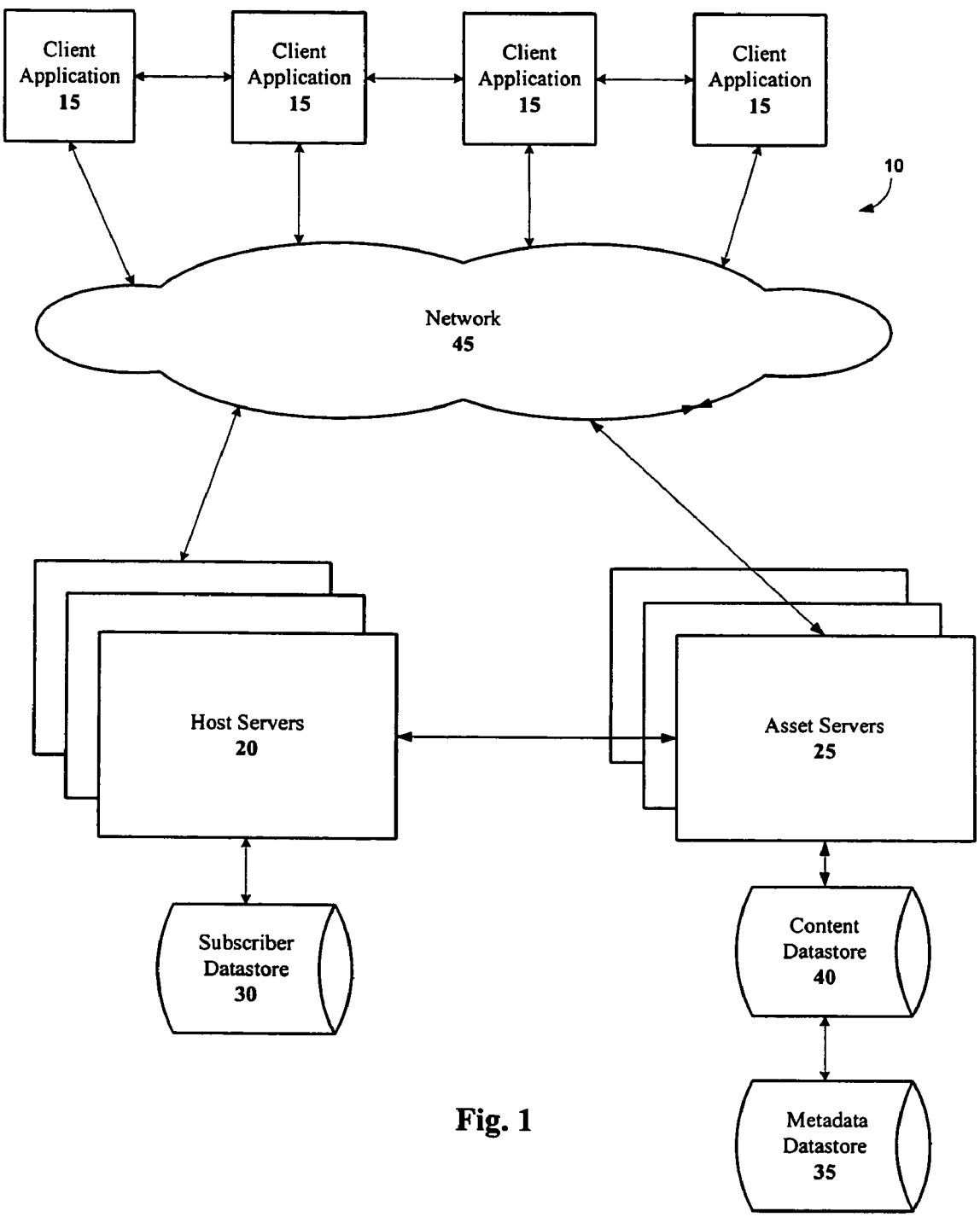

Having thus described the invention in general terms, reference will now be made to the accompanying drawings, which are not necessarily drawn to scale, and wherein:

FIG. 1 is a high-level block diagram of an entertainment content distribution system in accordance with an embodiment of the present invention.

Figure 2:
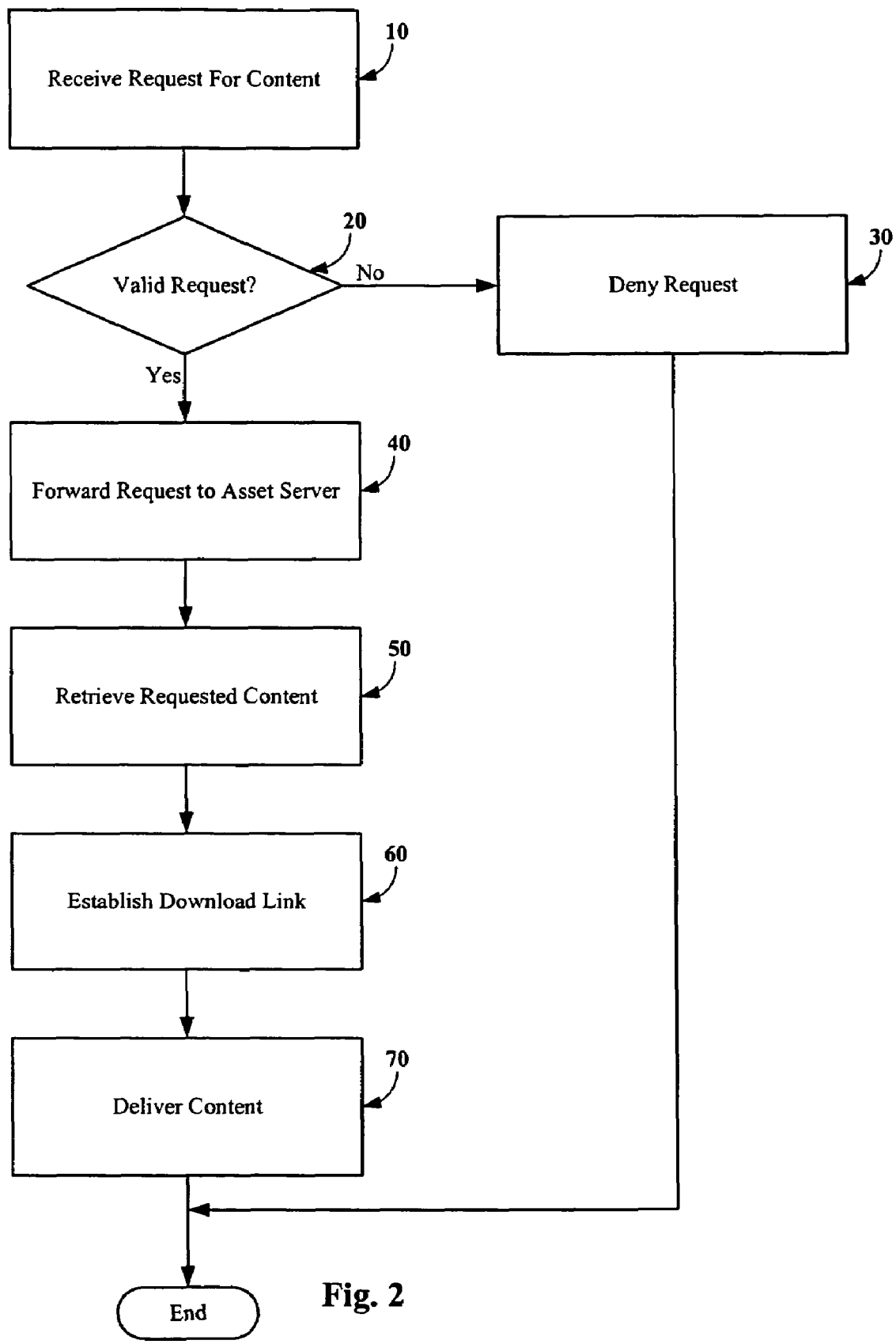

FIG. 2 is a flow chart that illustrates the interaction between the client application and host and asset servers to deliver content to a user.

Figure 3:
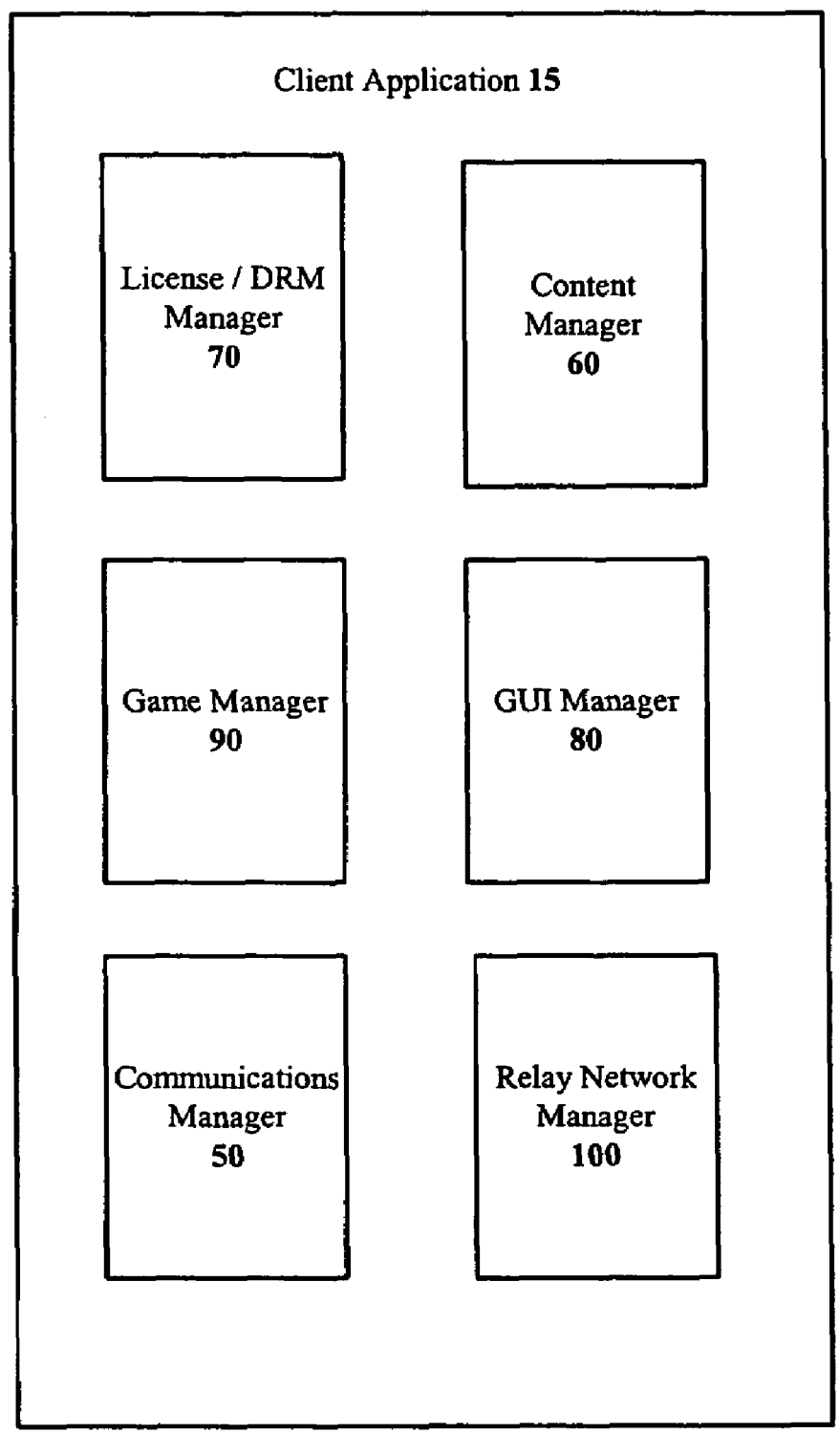

FIG. 3 is a high-level block diagram of the components of a client application in accordance with an embodiment of the present invention.

Figure 4:
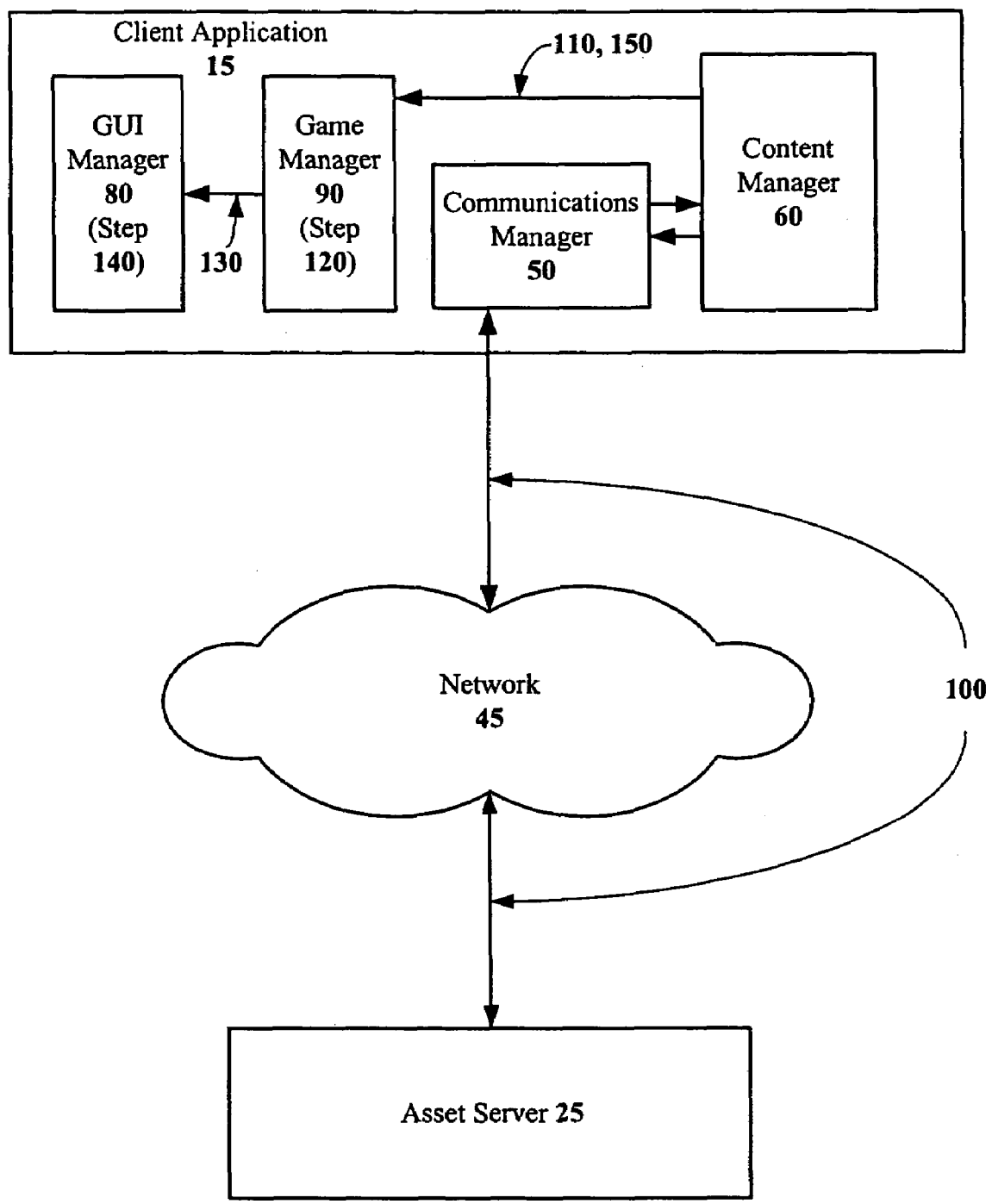

FIG. 4 is a process flow chart that shows the interaction between the content manager and other client components to track the progress of a download.

Figure 5:
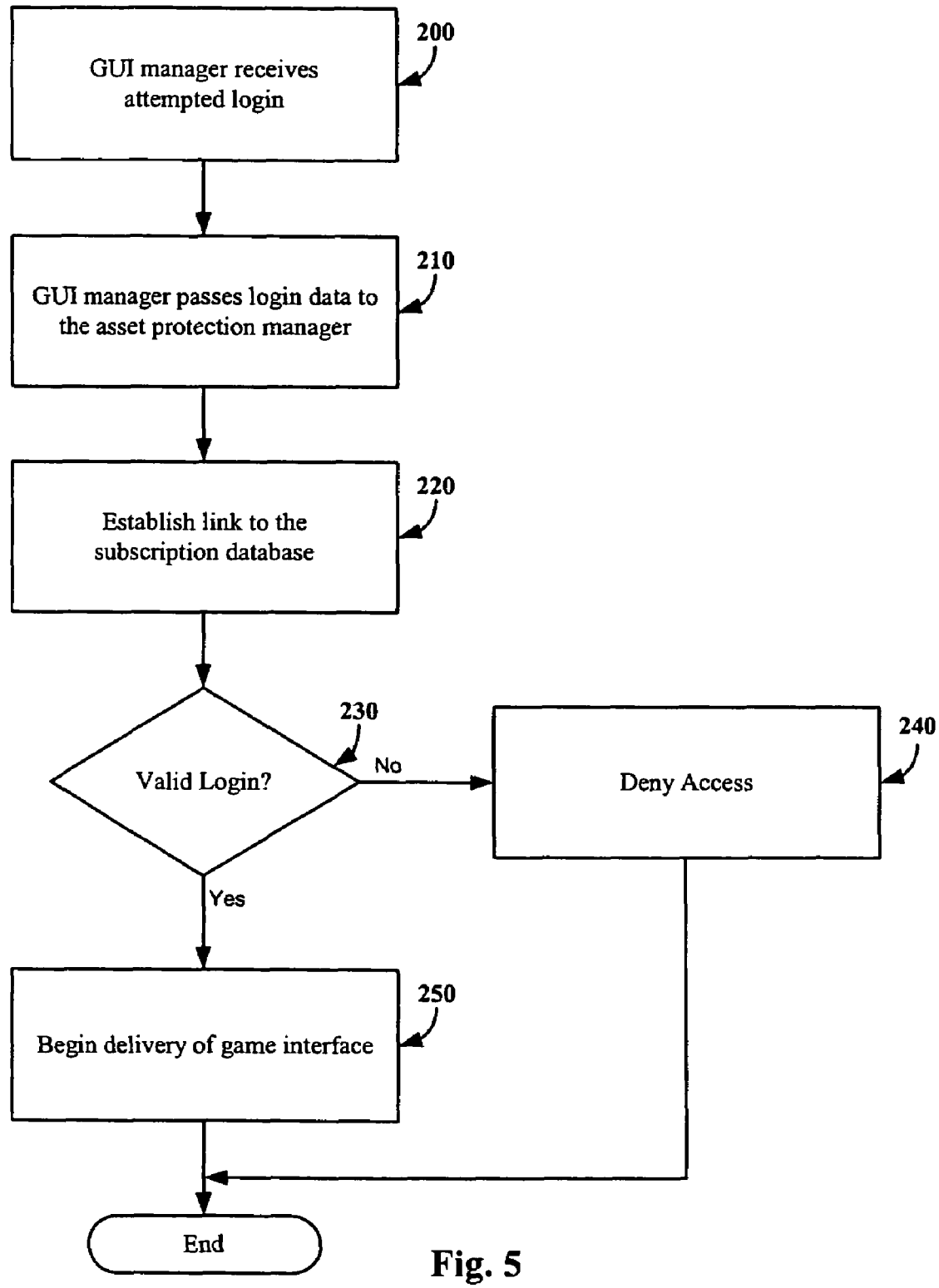

FIG. 5 is a process flow diagram of the steps to authenticate the login information of a user.

Figure 6:
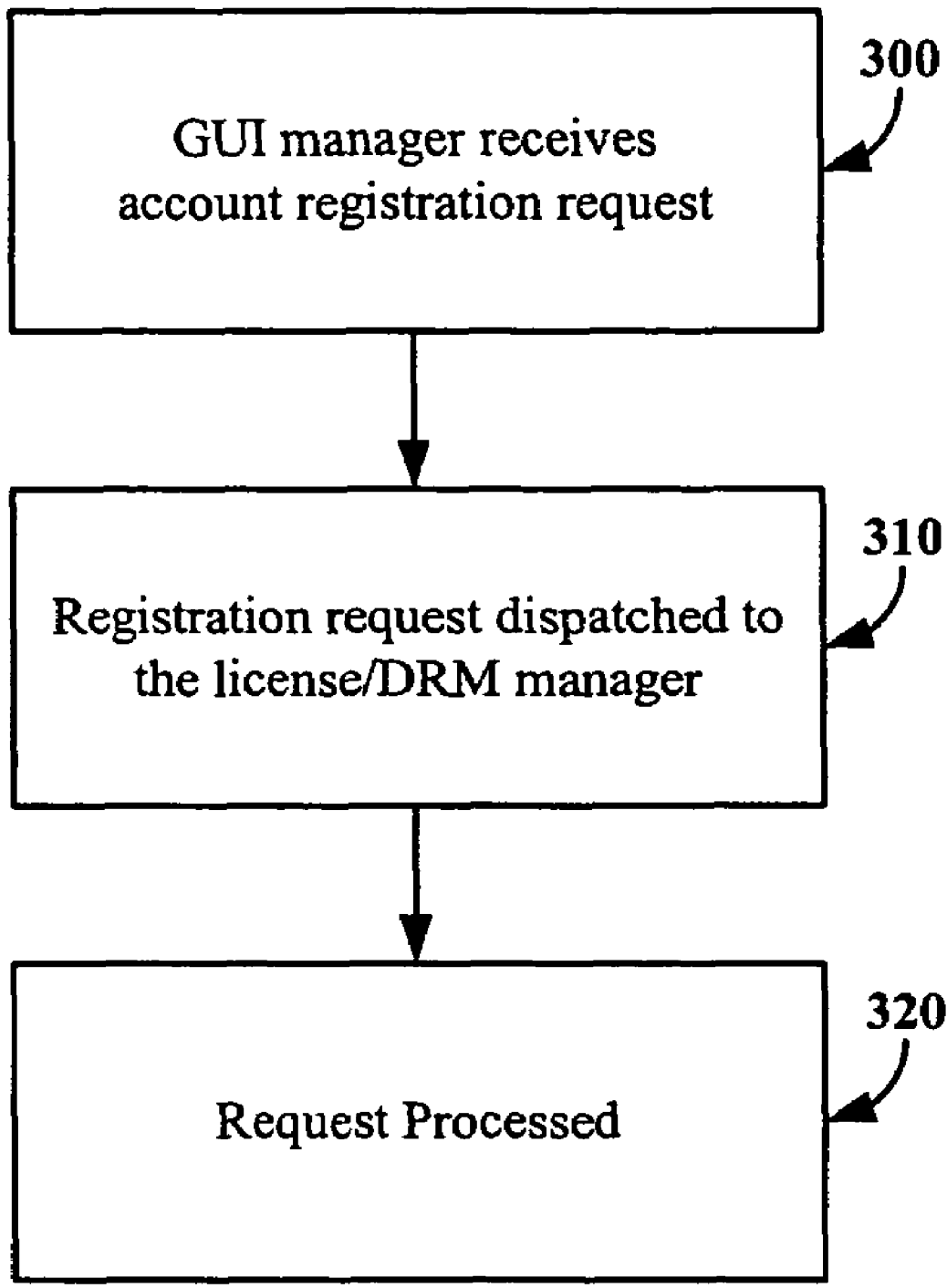

FIG. 6 is a process flow diagram of the steps to create a new account.

Figure 7:
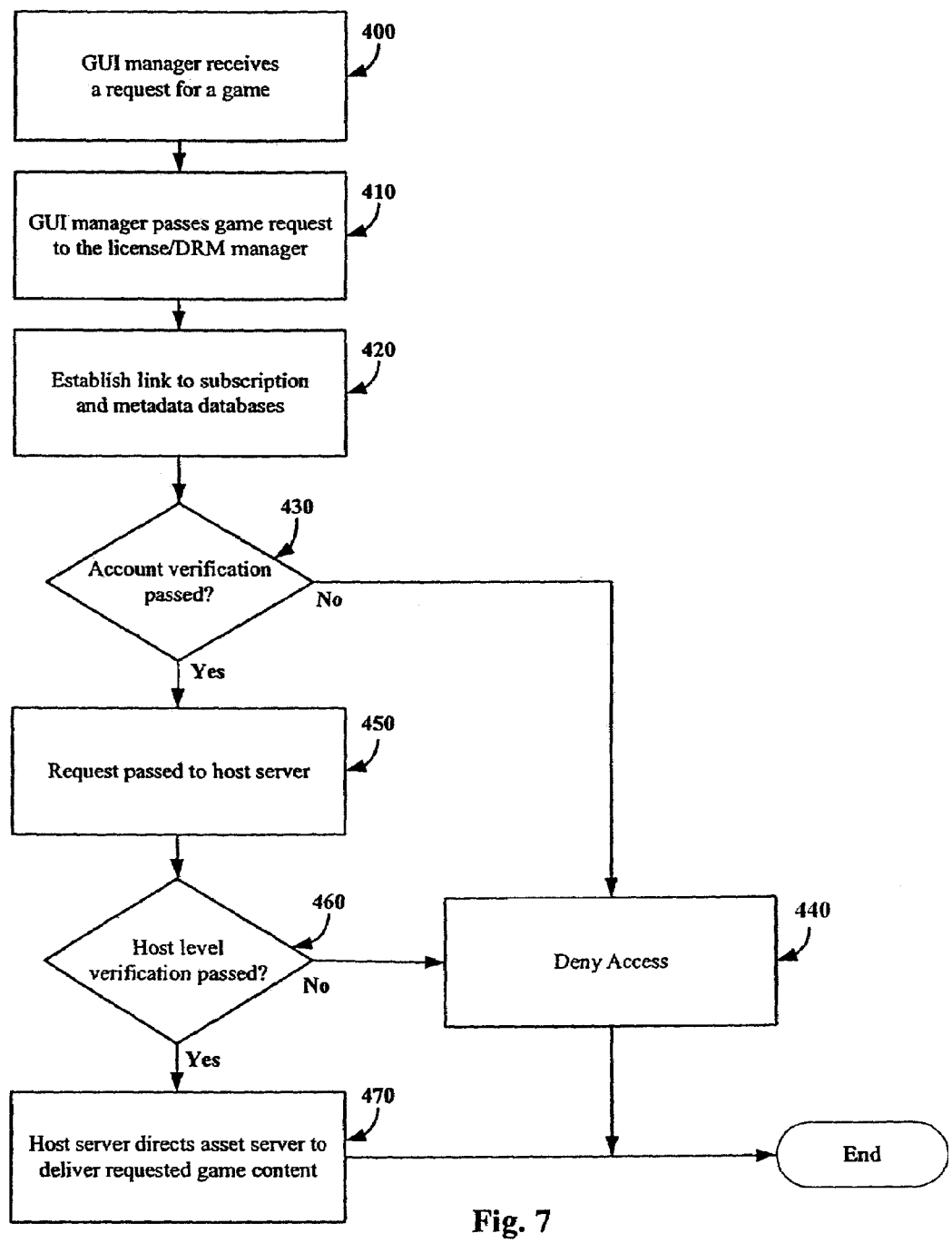

FIG. 7 is a process flow diagram of the steps to verify a user's right to access content.

Figure 8:
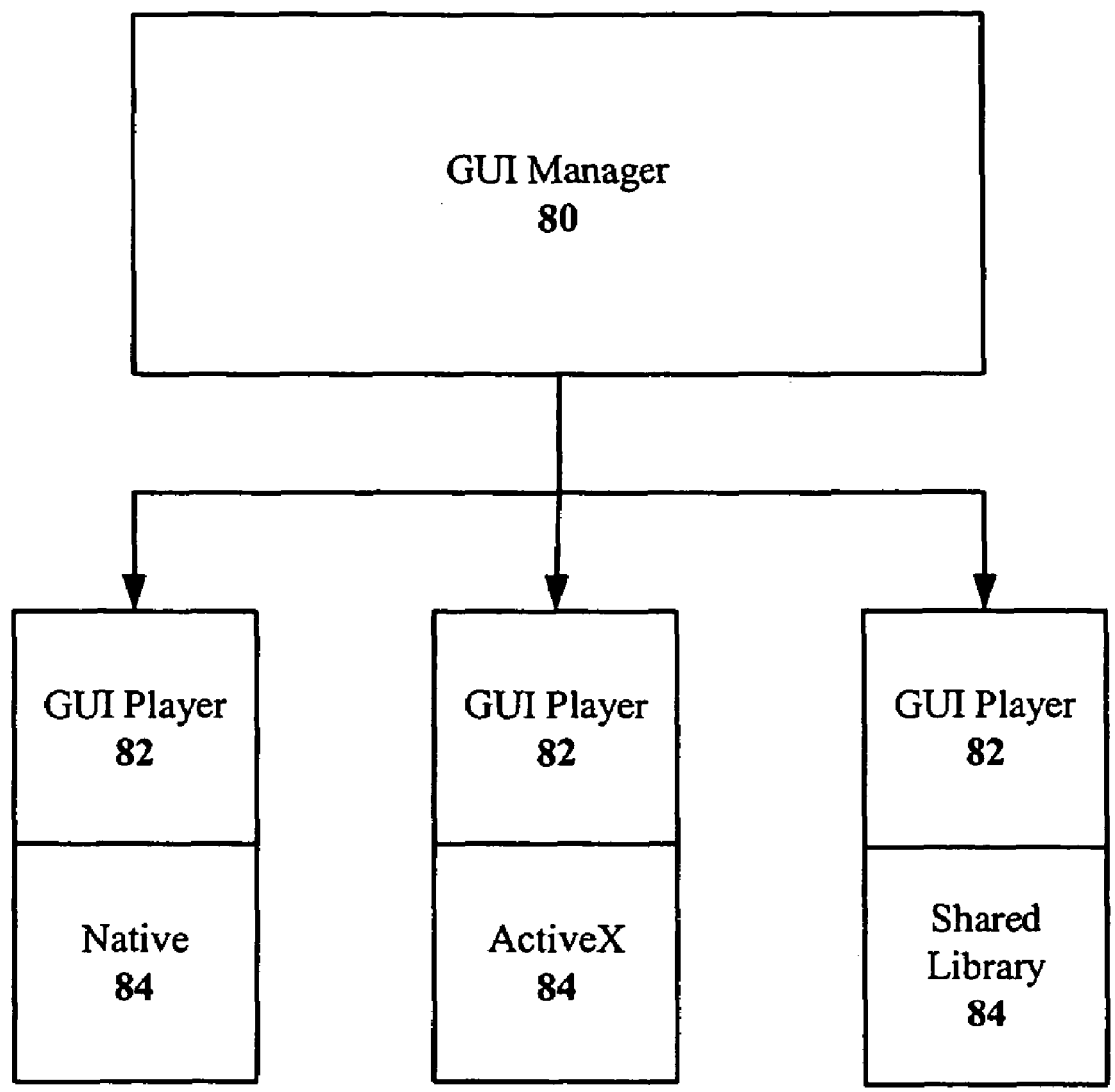

FIG. 8 is a block diagram that illustrates how a graphical user interface (GUI) manager uses GUI players to deliver content to users of a plurality of different systems.

Figure 9:
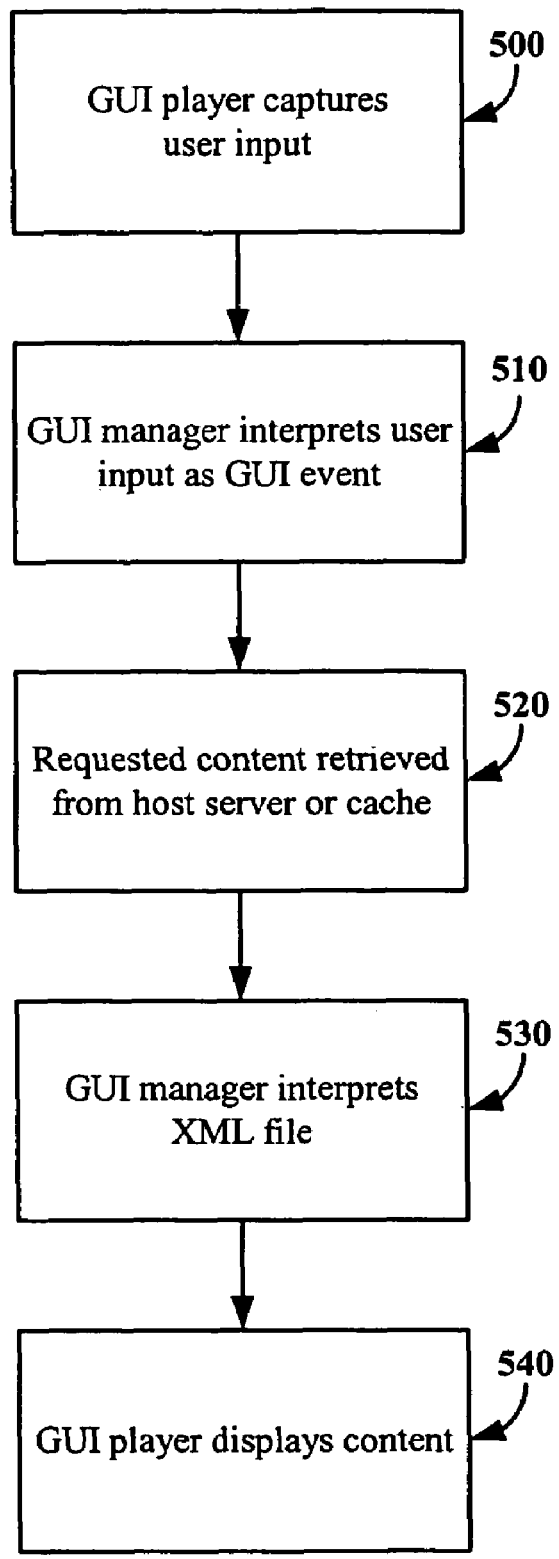

FIG. 9 is a process flow diagram that illustrates an interaction between a GUI manager and GUI player as the system processes a GUI event.

Figure 10:
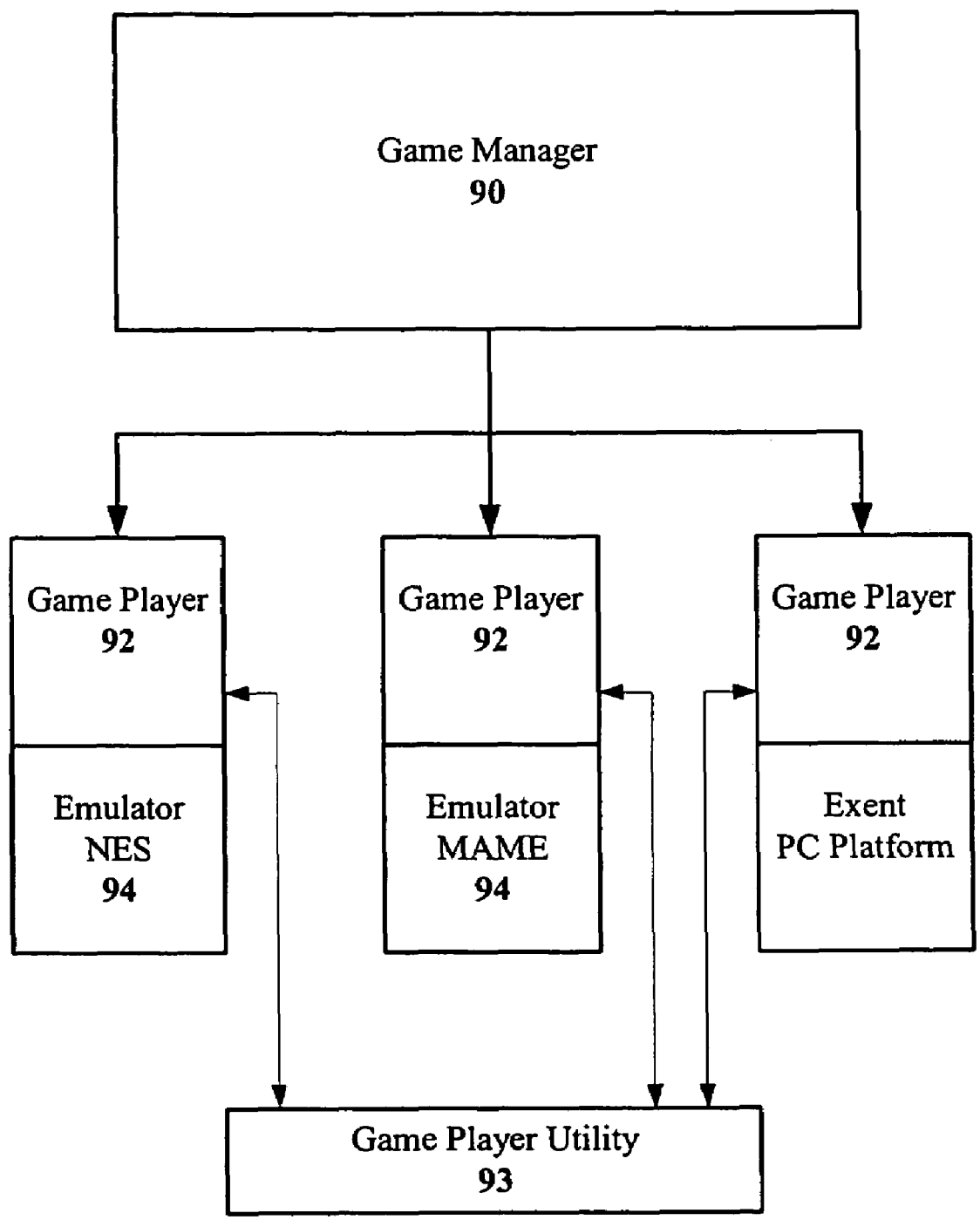

FIG. 10 is a block diagram that illustrates a hierarchical relationship between a game manager and a plurality of game players and emulators.

SUMMARY

The present invention is directed to methods and systems of delivering entertainment content via a network. An embodiment of the delivery system uses a graphical user interface and host avatar to introduce users to and allow them to select from available content. With regard to the delivery of games, emulators execute game code that is written to run on various gaming platforms. A dynamic interface launches and manages emulators in a manner that is largely transparent to the user. In a preferred embodiment, the combination of linear and on-demand content provides users with a managed gaming experience not unlike that of interactive television.

An embodiment of the present invention herein described is a game delivery system that allows a user to select from and receive delivery of at least one of a plurality of games via a network, the games include a first set of game code that is stored in a format to be run on a series of arcade game systems, a second set of game code is formatted to run on video game consoles and a third set of game code formatted for personal computers. The game delivery system includes an asset server that stores software game code associated with the three different sets of games, and a host server that directs the asset server to deliver a selected one of the games to the user.

Additional embodiments of the game delivery system describe using a client application residing on a computing device associated with the user that displays a listing of available games accepts a user request to play a game. In some described embodiments, the client application includes a plurality of emulators that are used to emulate the native platforms for which the plurality of games were originally intended to run. The emulators translate the native platform machine code blocks of the game code to functionally equivalent blocks of compiled instruction set code that run on the user device. In some embodiments, the client application is configured to begin play of a selected game before the entire game code is downloaded to the user device from the asset servers. Game play can be initiated as a foreground process, while additional game assets are simultaneously being downloaded in the background. Additional embodiments describe an incentive system, wherein players are rewarded for completing one or more predefined tasks. Rewards take various forms including badges, unlocked games or levels, and enhanced subscription rights.

Other embodiments of the present invention describe game delivery systems in which a game player is used in conjunction with the emulators to manage the user gaming experience. In some embodiments, a game player is associated with each of the emulators and monitors a game as it is being played. Game players are configurable to detect a preset list of keystrokes and to respond accordingly. Thus, for example, a game player may post a score upon receipt of a predefined key. Other functionality that can be monitored by the game player includes the ability to pause, or exit from a game or to obtain a hint for a game.

In various described embodiments, the client application has multiple graphic user interface modules that are configured to interact with different end-user devices. In some cases, the user interface of the system is modified to accommodate the specific type of user device, and in other cases the actual game, or at least the list of available games, are modified based on the specifications of the end-user device. Metadata is also described as associated with the game files. The metadata may include information about the game, such as, for example, the hardware requirements needed to run the game. Other types and uses of metadata are also described.

Also described herein are content delivery systems for providing linear and on-demand content to a user. In various embodiments, these content delivery systems include an asset server that stores at least a portion of the linear and on-demand content, the asset server being adapted to deliver the linear and on-demand content to the user via a network, and a client application in communication with asset server, the client application adapted to receive and present the linear and on-demand content to the user, wherein the linear content includes an audiovisual presentation of a graphical user interface and a host avatar, the host avatar assuming an animated electronic representation of a character, wherein further at least one of the graphical user interface and host avatar can be manipulated to provide access to the on-demand content.

In some described embodiments, the host avatar is an animated character that speaks and provides information about content that is available for download. In one embodiment, the host avatar is a human or human-like character that acts like a television show host that welcomes the user to the system and discusses the available content and system options. In some described delivery systems, the graphic user interface has several layers and each layer is associated with a subset of on-demand content. As described herein, a host server may manage the delivery of content from an asset server and the host server initiates delivery of the linear content to the client application when a user first enters the system. The linear content is then delivered to the user until the user exits the system or interacts with the user interface. Again, the system can be configured to work with a plurality of different end-user devices and the client application can be configured to detect one or more hardware capabilities of the end-user system and to conform the presentation of the linear and n-demand content to the system.

Another aspect of the present invention described herein are methods of delivering game content to a computing device associated with a user. The steps described in some of the methods include delivering a graphical user interface that displays a list of available games and allows the user to select a game from the list, receiving input indicative of a first game selection by the user; choosing one emulator from a plurality of emulators to emulate a hardware configuration of a game platform for which the first selected game was written; launching the one emulator and initiating game play of the first selected game; monitoring user input during the game play of the first selected game; and returning the user to the graphical user interface upon identifying in the user input one of a predefined set of user inputs.

Additional embodiments include the steps of terminating game play of the first game and allowing the user to start a second game, identifying a second emulator that is configured to emulate a hardware configuration of a game platform for the second selected game, launching the second emulator and initiating play of the second selected game; monitoring the user input during the play of the second selected game; and taking a game delivery system related action if the user presses one of the predefined set of user inputs. Still other embodiments add the steps of accessing an account associated with the user in response to the first game selection, verifying that the account gives the user access to the first game selection, and notifying the user if the user lacks access rights to the game. Other embodiments enhance this function by offering to upgrade the user account or by offering a trial version or limited time access to the first selected game.

Another aspect of the present invention described herein are systems for delivering game content to a user device via a network. Embodiments of these system include an asset server that stores a game file for a game written for a console gaming system; a datastore that includes game metadata associated with the game file, the metadata including a plurality of index points that logically divide the game file into a plurality of portions, a first index point identifying a portion of the game file that is required to initiate game play of the game, and one or more subsequent index points that identify one or more additional portions of the game file; and a client application that resides on the user device and includes a content manager that monitors a progress of a transfer of the game file from the asset server to the user device; and a game manager that manages the game play of the game on the user device; wherein the game manager receives the metadata from the datastore and periodic updates of the game transfer progress from the content manager, and initiates the game play of the game in response to an indication that a portion of the game file identified by the first index point has been transferred successfully to the user device.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

A. Content Distribution System Architecture

The present invention is described herein in the context of systems and methods that are configured to distribute entertainment content to clients over a computer network. But one of ordinary skill in the art will readily recognize that the present invention is not limited to the delivery of entertainment content and, in fact, the platform described below can be used to deliver other types of media, software applications and digital content as part of an on-demand service.

FIG. 1 illustrates a high-level view of an entertainment content distribution system 10 in accordance with an embodiment of the present invention. This embodiment of the distribution system 10 shows several client applications 15 communicating with a host server 20, preferably composed of one or more logical servers deployed on one or more physical server, and one or more asset servers 25 via a network 45. In addition, arrows are shown between the clients applications 15 to represent the possibility of data transfer between two or more client applications 15 via relay network communication techniques that are well known in the art. In general, each client machine has a client manager component that manages relay network communications.

In a preferred embodiment, the various users of the system are distributed over a large geographical area and the network 45 is a wide area network such as the Internet. And the volume of entertainment data passed to the client applications 15 is typically sufficiently large that a broadband link is preferably used to handle the communication that occurs between the client applications 15 and the network 45. But, as described below, the volume and type of data transmitted to and from the client applications 15 can be tailored to the requirements of the device used to execute the client application 15. As a result, the bandwidth requirements for the link between the client application 15 and the network 45 can vary, and the processes described herein may be accomplished by any of several known processes for transmitting digital data.

In a preferred embodiment, the host server 20 is realized as a Java application server, one of many known web application server architectures that can be used with the present invention. In an alternative embodiment, for example, a CGI-compliant web server such as an Apache or Microsoft IIS server or the like can be configured as the host server 20. Communication between different host server applications occurs via Java Bean exchange or other known protocols, such as the simple object access protocol (SOAP) or via HTTP request/response. A HTTP server and servlet container, such as Jakarta Tomcat 4.1 or Netscape iPlanet 6.1 can provide the services necessary to authenticate users, administer user profiles and serve content metadata.

As described herein, the host server 20 handles much of the game control and administrative function required by the entertainment content distribution system 10. But one of ordinary skill will recognize that some or all of the functionality and/or request targets (e.g., content catalogs, leader boards, etc.) described herein may be cached on the asset servers 25 or other machines for broadcast to client devices. In such case, the host server 20 updates the cached content on a periodic basis and the updated cache is then broadcast to the user devices.

User access to games and other types of content is typically predicated on having a valid subscription to the service, and the host server 20 may handle the processes of registering new users and modifying the subscription accounts of existing users. A single account may have multiple users and each user on an account may be configured to access a customized set of content. For example, a parent may have children of three different ages and can setup a subscriber account to assign each child a separate user identifier and password. This allows the parent to customize the content for each user to insure that each child can access only that content that the parent believes is appropriate for that child.

In one embodiment, when a user logs into the system 10, the client application 15 captures a user identifier and password and passes the login information to the host server 20. The host server 20 queries a subscriber datastore 30 and determines whether the user login information corresponds to a valid subscriber account. The response to the login authentication process is then passed from the host server 20 to the client application 15 as an XML structure or the like. In some embodiments, a user key entry of login information can be replaced or supplemented with a smartcard or other card reader system that allows a user to use a card on which information is stored that identifies the user as authorized to access the system 10.

If a account owner limits the content that can be accessed by a user, then the host server 20 may send the client application 15 only those content options that are authorized. Alternatively, the asset server 25 can send the client application 15 a list of every available content option that can be combined with instructions or rules from the host server 20 to "gray out" or hide altogether content that the user is not authorized to access. Still another option is to send the client application 15 a list that includes all available content options, but to deny access if the user requests unauthorized content. Again, one of ordinary skill will recognize that the available content may not be determined dynamically (on a transactional basis) at the host server 20, and instead may be pre-generated and cached on the asset servers 25 (or other suitable storage device) for broadcast to interested client systems.

When a user selects a game (or other content) the client application 15 sends the host server 20 a request for content. In a preferred embodiment, the content served to the client applications 15 is stored and processed from a plurality of asset servers 25 that are distributed at different places within the network. Substantial benefits in network performance can be obtained by storing and processing content from asset servers 25 that are efficiently distributed across the network 45. But one of ordinary skill will readily recognize that an embodiment of the system 10 can be built with content is stored and processed from a single, central data location such as the host server 20. The benefits and use of distributed web architectures are well known in the art and globally-distributed data storage and server systems are available from companies such as Akamai Technologies, Inc.

In a preferred embodiment, when a user initiates a request for a game or other content, the content is distributed from the asset servers 25 to the client application 15. In one embodiment, the communication between the asset servers 25 and client application 15 occurs via a hypertext transport protocol (HTTP) request/response transaction. In alternative embodiments, communication may occur via a transmission control protocol/internet protocol (TCP/IP) socket connection or via some combination of HTTP and a socket connection. Socket connections are well known in the art as a means of continuous data transmission between computer systems.

The communication between the host server 20 and the client applications 15 and between the host server 20 and asset servers 25 is preferably via HTTP. Whereas a socket connection requires a continuous connection between two computers, HTTP is a stateless request/response system that maintains a connection between client and server only for the length of the immediate request. After a generic TCP client establishes a HTTP connection with a server and sends a request command, the server returns a response and closes the connection.

In response to a request from a client application 15 for a game or other content, the host server 20 retrieves information about the requested game from a metadata table or datastore 35. The metadata datastore 35 typically stores information about the available content rather than storing the content itself. In the context of games content, the data stored in the metadata datastore 35 may include a game title, release date, genre, number of players, supported game controllers, minimum and recommended system requirements, original platform and an entertainment software rating board (ESRB) rating or other parental guidance indicia. As described below, the content distribution system 10 of the present invention can be configured as a gaming network that distributes games on-demand to clients via the Internet or other network. Many of the games distributed through the network were originally written as arcade games or for a home gaming systems such as offered Nintendo, Sony, Microsoft, Sega and Atari, among others. In a preferred embodiment, the metadata datastore 35 has information about every game that is available to subscribers of the content distribution system 10 and, for each game, the metadata includes information about the platform for which the game was originally written and the system requirements needed to run the game.

A role of the host server 20 in delivering content to the subscriber is to communicate with the asset servers 25 to direct the delivery of the content to the appropriate client application 15. The host server 20 may also optionally perform several other administrative processes related to the delivery of the content. An administrative process that has already been discussed is a verification that the user is authorized to access the requested content. This can occur at the user level to verify that the account owner has not restricted the user's access to the requested content, or the verification can occur at an account level to confirm that the account rights extend, to the requested game.

Another administrative process that the host server 20 optionally performs is a check of the user system to confirm that it satisfies the minimum system requirements of the requested content. User system specifications may be stored in the subscriber datastore 30, or alternatively, the client application 15 may be configured to use one of several known techniques to detect the specifications of the system on which it is running. The host system 20 then compares the user system specifications against the minimum and recommended requirements of the requested game and sends a message to the client application 15 as to whether the game requirements are or are not met.

The secure content in the form of whole files or blocks of data delivered to the client application 15 is stored in a secure content datastore 40 such as n encrypted virtual disk volume 40, non-secure content such as advertisement video is preferably stored in a non-secure datastore 40. Game content, for example, is typically stored as a binary file that resulted from compiling the original source code. These binary files may or may not be compressed and typically use the .zip, .NES or similar well known file extensions. If the content is an arcade or video console game, the game file may contain the machine language used by the original platforms to execute the game. When the game file is delivered to a client application 15, an emulator software component in the client application 15 emulates the original platform to allow the game to play on the user system much like it did on its original platform. The type of content stored and delivered to clients via the system 10 is not limited to game ROMs and can include audio, video, and two and three dimensional assets or media, among others, some or all of which can be delivered via streaming (continuous transmission of data) and other known data transmission processes.

FIG. 1 shows an embodiment of the entertainment content distribution system 10 in which the subscriber datastore 30, metadata datastore 35 and content datastore 40 are shown as individual storage systems. But one of ordinary skill will readily recognize that these datastores can be configured as part of a single database or similar data storage device and that a relational database management system (RDMS) such as Oracle 9i can be used to process some or all of the data from a single server.

FIG. 2 illustrates the steps required to deliver content to a user system in accordance with an embodiment of the present invention. In Step 10, the client application 15 sends a request for content to a host server 20. In Step 20, the host server 20 performs some or all of the validation steps described above to confirm that the user is authorized to access the content and, in the case of a game, has a system that can run the game. If a determination is made that the user is not authorized to access the content or that the user system does not meet the necessary hardware requirements, the process proceeds to Step 30 and the host system 20 returns a response to the client application 15 indicating that the response cannot be processed. If the request for content is validated, the process proceeds to Step 40 and the host system 20 dispatches a command to an asset server 25 to deliver the requested content to the user. In the case of a distributed asset server 25 system, the host server 20 may perform an additional step of determining which of several geographically distributed asset servers 25 is best positioned to deliver the requested content to the user. Alternatively, a determination of which asset server 25 is best positioned to deliver the requested content is performed by a server application that manages the server farms.

In Step 50, the asset server 25 retrieves the requested content from the content datastore 40. In Step 60, the asset server 25 establishes a communication link with the appropriate client application 15 and in Step 70 the asset server 25 delivers the content to the user. Depending on the size of the content file or files being transferred, the content may be delivered in segments or as a single file. For example, games that were originally written for the Atari and Nintendo video console systems are typically less than a megabyte in size and require just a few seconds to download to the client application 15. In contrast, a medium-size game written for the Sony Playstation console is about 100 megabytes in size, and a game written for a personal computer typically ranges between several hundred megabytes to several gigabytes of data.

In a preferred embodiment, the content distribution system 10 presents users with an environment that is similar to the television viewing experience from which the users select and access content. In the context of a gaming network, the system 10 manages the user experience by offering commercial advertisements or other forms of audiovisual content between game levels and during download wait times. If the requested content loads completely before the end of the commercial, users can choose to watch the rest of the commercial (or other transitional content) or to proceed to the game.

Another aspect the distribution system 10 that manages the game experience and gives users a television-like experience is the use of a virtual environment (sometimes referred to herein as a graphic user interface environment). In one embodiment, the user interface environment includes a host avatar placed in a computer-generated setting. The user interface environment serves as the default content and is preferably the first thing the user sees upon entering the system 10. Users manipulate objects in the environment and/or navigate through one or more background or interface settings to select content, list available content and to set game and system options. Games are entered from the user interface environment and users return to the environment when a game is paused or ended.

As part of the user interface, the host avatar serves almost as a television show host or news anchor that greets users with information about new games, contests and other gaming-related information. Users may optionally have the ability to select between several pre-existing avatar images or the system 10 may use one of several known graphics tools to allow users to customize their own avatar. Similarly, the virtual setting for the host may be determined by the system 10 or optionally can be user-customized.

The avatar host and other parts of the user interface may comprise two-dimensional or three-dimensional media elements. The system 10 preferably offers both a two-dimensional and a three-dimensional version and users can choose which version they prefer. The complexity or graphic-intensive nature used for the user interface environment also depends on the system used to run the client application 15 For example, a first user runs the client application 15 on a high-end computer system equipped with a fast video card that allows the user to receive and process three dimensional images. This user may opt for a graphic-intensive presentation of the avatar and background environment. A second user runs the client application 15 on a low-end computer system that does not have a fast video card. This user may opt for a two-dimensional version of the virtual environment, or the client application 15 may detect the hardware limitations of the user system and adjust the content accordingly. Additional users may run the client application 15 on a set top box of a cable or satellite system, a personal digital assistant (PDA) device, cell phone or other digital electronic device. In a preferred embodiment, the virtual environment is adjusted to adapt to whatever hardware the user uses to access the system 10.

Another aspect of the system 10 is the implementation of a programming reward system that incentives users to participate in a variety of activities or challenges. The challenges can include the playing and mastering of selected games, participation on tournaments and achievement of certain levels in selected games, among others. The incentives can take many forms including the earning of badges or other honoraries, or the unlocking of special games or game levels, to name a few. Badges, levels, tournament trophies and other incentives preferably persist with a user account and graphical summaries of a user's achievements can be shared with other users via an online communication interface such as the AOL instant messenger service.

Still another aspect of the system is the delivery of commercials or other transitional content between game levels or during download wait times. In a preferred embodiment, the transitional content can be targeted to specific types of users based on information in the subscriber datastore 30 or content that is selected by the user. For example, a car manufacturer might request that an advertisement for a sports car be delivered to male users between the ages of sixteen and thirty-five. In an embodiment of the present invention, the content distribution system 10 uses a priority list of paid-for commercial content to determine which commercial to show to users. The commercial at the top of the priority list is used the next time a commercial is delivered to a user and once the commercial is delivered it moves to the bottom of the priority list. When a commercial that is targeted for a specific subset of users reaches the top of the priority list, the host server 20 performs a check of the account profile for the user to see if the user falls within the advertiser's target market. If the user meets the advertiser criteria, the commercial is delivered to the user. But if a user does not meet the criteria, the host server 20 uses the next commercial in the priority list and the commercial that was skipped remains at the top of the priority list until it is delivered.

Transitional content can also be tied to specific entertainment content. A commercial for sporting equipment, for example, may be associated with a particular game or game genre. If a user requests a game or game category that has been targeted by an advertiser, the metadata associated with the game specifies which commercial or set of commercials should be shown as the game is downloaded and between game levels. As part of the delivery process, the host server 20 checks the metadata to determine if specified commercials or other transitional content has been specified for the requested game. The host server 20 delivers any specific content specified in the metadata datastore 35, and if none is specified, delivers the advertising content in accordance with the priority list. One of ordinary skill in the art will readily recognize that any content can be delivered and that the present invention is not intended to be limited to transitional content in the form of commercial and advertisements. Examples of non-commercial forms of transitional content that can be delivered to a user as a requested game is downloading can include mini-games, tips, game cheats, game instructions and a brief history about the game being downloaded.

As described above, the game content that is delivered to users can involve large amounts of data. If a user requests content that requires that the system 10 deliver a large amount of content to the client application 15, then the user may experience large download delays that detract from the entertainment experience that the system 10 is intended to create. To help alleviate this delay, an embodiment of the distribution system 10 includes a content download process that allows a user to start playing a game before the entire game is downloaded. The mechanics of this process are described in detail below. In general, the system 10 downloads enough of the game so that the user can begin play and the system 10 downloads the balance of the game as a background process while the user is playing the game in the foreground.

Another pre-load operations that is optionally part of the content distribution system 10 is the download of content while a user logged off the system 10. The technology required to perform this process is known in the art and is found in products such as ESPN Motion. In general, if a connection is maintained between the user system and the network 45 after the user has logged off of the system 10, the client application 15 uses this connection to download and store content on the user hard drive. The next time the user logs into the system 10, the client application 15 delivers the locally-stored content making it appear to the user as if the content was downloaded instantaneously. In this way, the user experience is enhanced and the gaming environment bears a greater resemblance to a television experience than does any known console or personal computer gaming system.

B. Client Application

FIG. 3 illustrates a high-level view of the components of the client application 15 in accordance with an embodiment of the present invention. This illustration includes a communications manager 50, content manager 60, asset protection manager 70, graphical user interface (GUI) manager 80, and game manager 90. The client application 15 is preferably written using C and/or C++ programming languages that integrate the various client components, loading the components as needed depending on user actions. One of ordinary skill in the art will readily recognize that the foregoing is an exemplary configuration and that a client application 15 can be developed using other software languages and architectures.

The communications manager 50 is responsible for communication between the client components and the server-side applications. The communications manager 50 uses known processes to implement the protocols for data transfers including HTTP, TCP/IP and socket communications. In a preferred embodiment, XML or like structures are used to transfer content objects, chat objects and system communication commands. But one of ordinary skill will readily recognize that other known structures for data transfer can be used with the present invention.

The content manager 60 is responsible for the transfer of data between the client and server-side applications and additionally manages the disk space cache of the user machine. The content manager 60 manages the download of data from the host server 20 and asset servers 25. In addition, the relay network manager 100 can support relay network or peer-to-peer file sharing so that content can be shared between various users of the system 10. Peer-to-peer networks that allow all machines in a network to act as a server for the purpose of file sharing are well known in the art. One of ordinary skill will readily recognize that the data transfer efficiencies can be gained by using a relay network and that known techniques for achieving these efficiencies can be adapted for use with the present invention.

As discussed above, the content manager 60 uses known data transfer techniques to support data downloads in foreground and background modes. In either mode, the content manager 60 monitors and reports the progress of the download to the other client components. FIG. 4 is a process flow chart that shows the interaction between the content manager 60 and other client components to track the progress of a game that is downloading in a foreground mode. In Step 100, an asset server 25 establishes an TCP/IP communication (either via HTTP or open socket) with the client application 15 via the communications manager 50 and starts a download. The content manager 60 monitors the download and at Step 110 at predetermined intervals transmits the download progress to the other client components. The progress update typically takes the form of bytes downloaded, but the content manager 60 can be programmed to convert the progress to a percentage of the total download. In Step 120, the game manager 90 receives the download progress update from the content manager 60 and, in the illustrated embodiment, the game manager 90 converts the download progress into a percentage of the total download. In Step 130, the game manager 90 passes a percentage download complete update to the GUI manager 80, and in Step 140 the GUI manager 80 displays the download progress to the user. When the download completes, the process moves to Step 150 and the content manager 60 dispatches a download complete message to the game manager 90.

The content manager 60 also provides progress updates for downloads that occur as a background process. When downloading in a background mode, progress reports are not displayed to the user and instead are published to the interested client components. The following example describes the use of progress reports for a download that occurs in a background mode. Assume that a user wants to play a golf game and in response to the request the host server 20 retrieves the metadata for the requested game. Among other information in the metadata is an indication that the golf game spans several hundred megabytes of data. Recognizing that it will take a substantial amount of time to download that much data, an administrator has previously analyzed the software code for the game and established several benchmarks (sometimes referred to herein as index points). The metadata preferably includes these index points and, as a result, identifies that game content that must be downloaded to start the game and the content that must be downloaded for each successive index. An aspect of the present invention, thus, is the progressive download of content, including game content that was originally written to play on arcade-style machines, dedicated game consoles and personal computers.

The host server 20 communicates the index points to the content manager 60 and game manager 90 (via a header file that precedes the content data) and the download of the game begins. To show the switch from a foreground to a background download, we assume that the content manager 60 downloads the initial portion of the game as a foreground process. But a commercial or other type of transitional content could, of course, be delivered during the initial download, in which case the entire game download would occur as a background process. As the first part of the game downloads, the content manager 60 monitors and reports the download progress to the GUI manager 80 and the progress is displayed to the user. When that portion of the game required to start play has finished downloading, the game manager 90 launches a game player and play begins.

While the user plays the first part of the game, the rest of the game continues to download as a background process, and the content manager 60 monitors and reports on the progress of the download. Periodic download status updates are published from the content manager 60 to the other client components. In one embodiment, the game manager 90 compares the amount of data downloaded against the benchmarks set out in the metadata to determine when benchmark in the game is reached. In the context of a golf game, each benchmark might represent a golf hole and as each benchmark is reached, the game manager 90 recognizes that a new golf hole is available to play. In an alternative embodiment, the content manager 60 performs the comparison of the download progress to the index points, and dispatches a message to the game manager 90 when a new index is reached. In still another alternative embodiment, a new component is part of the client application 15 and has the responsibility of monitoring the download progress received from the content manager 60 and reporting to the game manager 90 as index points are reached.

Updates to the user interface can also be downloaded in a background mode while a user accesses other entertainment content in the foreground. This is another technique employed by the system 10 to enhance the gaming experience. When a user returns to the interface after pausing or ending a game, the user receives an updated version of the interface (a different virtual setting for example) and it preferably appears to the user as though the update downloaded instantaneously.

In a preferred embodiment, before initiating any download as a background process, the content manager 60 determines whether the processing that is occurring in the foreground will be substantially impacted if a download is added as a background task. Software applications are known in the art that measure the processing load on a user system. The content distribution system 10 can leverage these known applications to determine whether adding a background download will impact the processing that is occurring in the foreground. Alternatively, the system 10 restricts and/or eliminates the use of background-mode downloads if a user system does not meet certain predefined system specifications.

Returning to FIG. 3, the next component of the content distribution system 10 is the asset protection 70. In a preferred embodiment, licensing and asset protection functions are combined into a single asset protection module, but one of ordinary skill will readily recognize that some or all of the functions can be separated into multiple components. Licensing functionality that preferably resides in the asset protection manager 70 includes user authentication and registration and request verification. User authentication concerns whether a user has rights to access the system 10, user registration is used to add a new account or a new user to an existing account, and the verification function involves checking a user account to determine whether a user has rights to perform a requested activity. Some or all of the business logic for these licensing functions may reside in the asset protection manager 70 or the manager may serve as an interface to a third-party service that handles the account administration function.

FIG. 5 is a process flow diagram that illustrates the steps required to authenticate the login information of a user in accordance with an embodiment of the present invention. In Step 200, the GUI manager 80 receives a user identifier and password from an attempted user login. The GUI manager 80 is programmed to recognize the keystrokes as an attempted login. In Step 210, the GUI manager 80 passes the login information to the asset protection manager 70. In Step 220, the asset protection manager 70 uses the communications manager 50 to access a subscription datastore 30. In Step 230, the asset protection manager 70 queries the subscription datastore 30 and authenticates the user login. If the login information does not correspond to an active account, the process proceeds to Step 240 and the asset protection manager 70 dispatches a message to the user (via the GUI manager 80) indicating that the user has entered invalid login information. If the login is valid, the process proceeds to Step 250 and the asset protection manager 70 notifies the other client components of a successful login. In a preferred embodiment, upon receiving a successful login the client application 15 uses processes described below to begin delivering the system's gaming interface to the user.

FIG. 6 is a process flow diagram that illustrates the steps required to create a new account in accordance with an embodiment of the present invention. In Step 300, the GUI manager 80 receives a request to create a new account and captures the requisite account information. In a preferred embodiment, the option to create a new account is part of a login presentation and the GUI manager 80 is configured to respond to a create account request with a form that prompts the user to enter the requisite information. In Step 310, the GUI manager 80 dispatches a create account event to the asset protection manager 70 and the in Step 320 the asset protection manager 70 processes the request.

The processing required to create a new account depends on the business requirements of the distribution system 10. As an example, if no fee is associated with the registration process, the asset protection manager 70 creates a new account by verifying that the entered information satisfies the registration criteria and adding a new record to a subscription datastore 30. If the user is requesting a free-trial of an account, the asset protection manager 70 may perform the additional step of determining whether the user qualifies for a free-trial. On the other hand, if the registration requires a fee, the asset protection manager 70 contacts a host server 20 and/or a third-party service to validate the credit card or other payment information supplied by the user.

FIG. 7 is a process flow diagram that illustrates the steps required to verify a user's right to access content in accordance with an embodiment of the present invention. As will be readily apparent to one of ordinary skill, many of the processes described herein include, either expressly or implicitly, the step of using the asset protection manager 70 to verify the user right to perform a requested action. In Step 400, the GUI manager 80 receives a user's request to play a game. In Step 410, the GUI manager 80 dispatches the request to the asset protection manager 70. In Step 420, the asset protection manager 70 uses the communication manager 50 to access the subscription 30 and metadata 35 datastores. In Step 430, the asset protection manager 70 verifies whether the account rights extend to the requested game.

Several verification processes can occur before a user is granted rights to access content, but, in this example, the verification is limited to determining whether the account rights extend to the requested content. In a preferred embodiment, a metadata record associated with the requested content has one or more identifiers that indicate whether the game is considered premium content and the types of subscriber accounts that have access rights to the game. The asset protection manager 70 uses this metadata and the account information from the subscriber datastore 30 to verify that the requested access is permitted.

If the account rights do not extend to the requested game, the process proceeds to Step 440 and the asset protection manager 70 dispatches a message to the GUI manager 80 denying the user request. But if the asset protection manager 70 determines that the account rights include the requested game the process proceeds to Step 450 and the user request is passed to the host server 20. At Step 460, the host server 20 performs additional verification processes. These processes may include a determination whether the account owner has restricted the particular user from accessing the requested content using parental controls functionality, and whether the user's system satisfies the minimum hardware requirements to play the requested game. One of ordinary skill will recognize that the processing illustrated in FIG. 7 is intended to be illustrative and that the asset protection manager 70 or the game manager 90 may perform some or all of these processes.

If the host server 20 does not verify the user request, the process returns to Step 440 where a request denied message is displayed to the user via the GUI manager 80. But if the host server 20 approves the user request, the process proceeds to Step 470 and the host server 20 directs an asset server 25 to deliver the content (the process used to deliver game content to a user is described below).

Another role of the asset protection manager 70 is to protect the rights of access to and use of content distributed by the system 10. A variety of processes are known in the art for securing and protecting digital content. One of ordinary skill in the art will readily recognize that some or all of these processes can be used with the content distribution system 10 to secure and protect the content delivered to users.

In the content distribution system 10, assets in the form of digital content are stored in encrypted form on asset servers 25 and, when downloaded, on the hard drive and memory cache of user systems. The encryption scrambles the content to make it unintelligible until it has been decrypted using a decryption key that changes periodically and is issued by the asset protection manager 70 as part of the verification process. In a preferred embodiment, the logic for the decryption process is integrated with the game manager 90 and allows the transfer of decrypted content to the game players on demand.

Returning again to FIG. 3, the next component in the client application 15 is the GUI manager 80. In general, the GUI manager 80 accepts input from the users and displays output to the users. User input typically comes from a keyboard and mouse but any gaming or input device that is known in the art can be supported. For example, in the context of a game distribution network, the GUI manager 80 accepts input from devices that include joysticks, game pads and gas pedal/steering wheel combinations, among others. And because the client is not limited to computer systems, user input can be received from electronic devices such as mobile phones, wireless handheld devices and cable set top boxes, to name a few.

FIG. 8 is a block diagram that illustrates how the GUI manager 80 uses device-specific components (referred to herein as GUI players 82) to receive and display output to different user devices. GUI players 82 are preferably configured to accept input from and display output to specific types of user devices. Each GUI player 82 performs the same function (input and output) and preferably interacts with the GUI manager 80 via a common interface. Each GUI player 82, however, is written to interact with a different communication layer 84 and a different set of user devices. As shown below, the GUI manager 80 handles the business logic for GUI events while GUI players 82 handle the presentation of the output to the user device. The separation of the GUI component responsible for the presentation (GUI players 82) from the GUI component that handles the GUI business logic (GUI manager 80) offers a degree of scalability that is not present in current systems. In a preferred embodiment, the GUI manager 80 need not be modified to add support for a new user device, and support for a new device can be added by writing a new GUI player 82 to interface with the communication layer 84 of the device.

Three known communication layers 84 are shown in the FIG. 8, the Native Windows environment, ActiveX controls and Dynamic Link Libraries (DLL) or another shared library. One of ordinary skill will recognize that the present invention is not tied to these communication layers and, in fact, one or more of these layers may be replaced by alternatives that are known in the art. These are intended to be illustrative and one of ordinary skill in the art will recognize that other communications layers are known in the art and can be used with the present invention. In a preferred embodiment, the communication layers 84 act as interfaces between the GUI players 82 and the hardware components of the different user devices. As an example, a module known as CTL3DV2.DLL is part of the DLL communications layer 84; when called this DLL module performs the graphic function of drawing a three-dimensional border around a dialog box. The benefit of having this module as part of a communications layer 84 is that a GUI player 82 can call this DLL module whenever it needs to draw a three-dimensional border in a DLL-supported device. Without this communications layer 84, to achieve the same result a GUI player 82 must interface directly with the hardware drivers of every user device supported by the system 10.

The choice of GUI player 82 determines the type of presentation that the user receives. Thus, a first GUI player 82 that is written to support a high-end computer system may produce a presentation that shows a user interface and host avatar as a full-screen, dynamic, three-dimensional image. While a second GUI player 82 that is written for a lower-end computer system may produce a two-dimensional presentation of the interface and avatar. And a third GUI player 82 written for a handheld wireless device or mobile phone may limit the presentation to a text message. GUI players 82 can thus modify the presentation of the system 10 to meet the specific hardware requirements of a user device. Used this way, the GUI players 82 allow the content distribution system 10 to support a broad range of user devices.

The following paragraphs describe the interaction that occurs between the GUI manager 80 and GUI players 82 as the system 10 processes a GUI event. FIG. 9 illustrates the interaction in the context of a user request for a listing of available content that begins with the letter "A." In Step 500, the GUI player 82 captures keystrokes (or another form of input) that the user enters to request a list of available content. In a preferred embodiment, the role of the GUI player 82 is to interact with the user device to capture the input, but not necessarily to interpret the input. Thus, in Step 510, the GUI player 82 passes the input to the GUI manager 80 and the GUI manager 80 performs the algorithm that interprets the input as a request for a list of available content that begins with the letter "A." The GUI manager 80 also preferably performs the logic of determining whether the requested content is stored in local memory or whether a call must be made for data that is stored at a remote location.

Step 520 represents the processing that is required to obtain the requested content. The content may be stored locally, or the GUI manager 80 may need to dispatch a content request from the communication and asset protection managers to retrieve the requested information. In Step 530, the GUI manager 80 builds the list that the user requested and sends the list to the GUI player 82. The GUI manager 80 may receive only that content that satisfies the user request, or the GUI manager 80 may receive a complete list of all available content. In the latter case, the GUI manager 80 is programmed with sufficient logic that it filters the content to show only that content that begins with the letter "A." Then if the user later requests content that begins with another letter, the GUI manager 80 can respond to the request without invoking another call to the host server 20.

In a preferred embodiment, data is transferred from the GUI manager 80 to the GUI player 82 as a XML file, though other methods of data transfer can be used in alternative embodiments. Because the GUI logic is separated from the GUI presentation, the GUI manager 80 provides the raw data to the GUI player 82 but offers no instruction as to how the content should be displayed. In Step 540, the GUI player 82 receives the XML file and leverages the necessary presentation logic and/or presentation template to display the list in a manner that is appropriate for the associated user device. While the vast majority of business logic associated with GUI operation preferably occurs in the GUI manager 80, the GUI player 82 and/or presentation logic associated with the GUI player 82 can process some basic GUI functions that do not require a call to the GUI manager 80. As an example, the GUI player 82 preferably will allow a user to scroll through the list of content without dispatching another GUI event to the GUI manager 80.

Returning again to FIG. 3, the next component shown in the client application 15 is the game manager 90. In general, the game manager 90 dispatches the user's request to play a game to an appropriate game player 92 and handles the business logic associated with playing a game. FIG. 10 is a block diagram that illustrates a hierarchical relationship that exists between the game manager 90 and a plurality of game players 92 and emulators 94 in accordance with an embodiment of the present invention.

Emulators 94 are generally known in the art as software applications that allow a computer or other user device to mimic the hardware of an emulated system. Emulators 94 are complex pieces of software that are written for video game consoles such as that made by Nintendo, Sony, Microsoft, Sega and Atari, among others. For purposes of the present invention, a video game console is a specialized computer systems that is configured to play video games. Game software for video game consoles is available on CDs or DVDs, although earlier game machines used cartridges in which the game software was stored on read only memory (ROM) chips. Video game consoles can be powered by microprocessors similar to those used in personal computers, but the hardware in a video game console is controlled by the console manufacturer, and the software is specifically geared to the machine's capabilities. A special subset of video game consoles are handheld video game systems, such as the Nintendo GameBoy, Sega GameGear and Atari Lynx machines. These are self-contained, portable and usually battery-operated versions of a video game console.

Two types of emulators are known in the art: the first is a single-system or single-game emulator, such as the NES (Nintendo) emulator, the Atari 2600 emulator and the Apple II emulator. These emulators only emulate one kind of system or game. The second type of emulator is a multi-emulator, the best example being the Multi-Arcade Machine Emulator (MAME). MAME emulates hundreds of arcade games that originally were written for hundreds of different arcade systems, many of which were equipped with different hardware configurations. Because each arcade game was written for a specific hardware configuration, MAME uses a driver system to emulate each game. And as a result, each arcade game that runs on MAME uses a driver that is specific to that game.

Another problem that occurs with emulators 94 that are known in the art is that each emulator 94 has its own unique way of loading games. A user that intends to run a game on an emulator 94 must read the documentation that accompanies the emulator to understand how the emulator 94 works and what games it supports. And in many cases, the user will find that the emulator 94 does not perfectly emulate the abilities of the system that it is intended to copy. With some emulators 94, the imperfections cause minor problems such as a glitch in graphics or a slight timing problem. In other cases, an imperfection has a more drastic impact that results in the game not running or a game that runs without sound, joystick support or some other significant features.

In a personal computer system that runs a version of Windows™ or a similar operating system, when an emulator 94 launches a game (which literally requires a command like C:\MAME PACMAN), the game is displayed in a full-screen Windows DirectX mode. As the emulator 94 runs the game, there is no communication between the game and the rest of the computer system. As shown below, the present invention supplies this missing interface and in a preferred embodiment the game player 92 fulfills this role.

With reference to FIG. 10, the game players 92 are software applications that wraps around and are uniquely configured to communicate with a specific emulator 92. Each game player 92 is preferably written as a tight interface to a particular emulator 92 and accesses the memory locations that the emulator 94 uses to control a game. Thus, for example, a game player 92 knows the specific memory locations that an emulator 92 uses to store data for saved games, game options, current scores and high scores. As a result, the game player 92 can track and report on a user's location and status within a game.

While each game player 92 is written to interface with a particular emulator 94, all game players 92 preferably use a common messaging format that allow them to communicate in a generic fashion with the game manager 90. As shown below, the game manager 90 handles the business rules associated with game delivery while the game players 92 and emulators 94 handle the actual mechanics of game delivery. This separation of the client components that handle game delivery (game players 92 and emulators 94) from the client component responsible for the business logic (game manager 90) offers a degree of scalability that is not present in current systems. In a preferred embodiment, the game manager 90 need not be modified to add support for a new emulator 94, and support for a new emulator 94 can be added by writing a new game player 92 to interface with the new emulator 94.

In one embodiment of the distribution system 10, some of the functionality of individual game players 92 are normalized and stored in a separate component that can be thought of as a game player utility 93. The game player utility 93 might, for example, include the presentation logic necessary to compress a signal into a particular image size. In one embodiment, the game player utility 93 is a common library that holds code used by multiple emulators. In the case of the presentation logic, many emulators use the exact same presentation logic to compress a game image. Rather than have the same code repeated in each of the plurality of emulators, the system 10 preferably uses the game player utility 93 to centralize the code used by the associated game players and/or emulators. A benefit of this approach is that the code can be updated with a single change to the game player utility 93 rather than necessitating code changes in each of the related emulators or game players.

Another benefit of this architecture is that a preferred algorithm or software routing can be made readily accessible to multiple emulators. For example, many emulators use a convolution filter or other interpolation routines to expand a game image so that the image can be rendered on a display device with better resolution than the display of the native system for which the game was written. While this functionality is present in several emulators, some convolution filters are better than others at rendering the image. The game player utility 93 allows a preferred routine to be stored in a single location and made available to multiple emulators. If the routine is later improved (or a better routine discovered), an update can be affected across all of the calling emulators by simply changing the code stored in the game player utility 93.

When a game is launched, the game player 92 monitors the keystrokes (and other supported input) of a user as the user plays the game. During game play, most user input relates to game play so the game player 92 takes no action and allows the emulator 94 to respond to the user input with an appropriate game play-related action (i.e. a user presses the spacebar to jump and in response the emulator 94 causes the user's in-game character to jump). But if the user input is one of a predetermined list of reserved keystrokes, control is passed to the game player 92 to take an appropriate system-related action.

The following paragraphs illustrate how a game player 92 is used as an interface between an emulator 94 that runs a game and a game delivery system that controls the emulator 94.

An embodiment of the distribution system 10 is a game delivery system that establishes a keyboard standard such that as a user plays a game certain reserved keystrokes will cause certain system-related events to occur no matter what game the user may be playing at the time. Thus, for example, the ESC key might be reserved by the game delivery system as a command to pause a game, while the function keys F1 through F6 might be reserved to start, stop, resume, save, load and post a game score, respectively. A role of the game player 92 in such a system is to monitor the input as a user plays the game and to initiate the appropriate system-related action when the game player 92 detects that the user has hit one of the reserved keys.

One of ordinary skill will recognize that some emulators 94 may require modification to adapt to this game delivery system model. Thus, for example, if an emulator 94 was originally written to use one of the reserved keys for a game-related activity (or as an emulator-related administrative feature) the emulator 94 must be modified to adapt to the keyboard standard of the game delivery system. For example, if an emulator 94 was originally written to terminate a game upon receiving an ESC, the emulator 94 must be rewritten so that when it detects the ESC key, the game is paused (rather than terminated) and game control is passed to the game player 92. To continue with the illustration, when the game player 92 receives game control from the emulator 94, the game player 92 preferably passes control back to the game manager 90 and an event is dispatched to the GUI manager 80 with instructions to display a virtual game environment (or other game network interface) to the user.

This interaction between the game manager 90, game players 92 and emulators 94 allows a user to pause in the middle of a game and enter the graphic user interface (i.e. the virtual game environment). From the interface, the user can return to the game, launch a new game or access the default content (i.e. a host avatar) associated with the interface. By returning the user to the interface and pausing, rather than terminating the emulation, the distribution system 10 provides a managed gaming experience that does not presently exist. This continuous delivery of entertainment content is a stark contrast to the disruptive experience provided to users in existing gaming networks. In traditional game systems, when a user exits an emulated game, the user is dropped back into the operating system of the computing device. And should the user wish to play another game, he or she typically must select an appropriate emulator 94 and enter the unique set of commands required by that emulator 94 to start the new game.

The following paragraphs illustrate the interaction between the game manager 90, game player 92, emulator 94 and other client components to deliver a game to a user in accordance with an embodiment of the present invention.

When a user requests access to a game, the game manager 90 receives the request from the GUI manager 80. The game manager 90 then verifies through the asset protection manager 70 that the user has the right to play the game. The game manager 90 also preferably contacts the subscription datastore 30 and/or the metadata datastore 35 to confirm that the user system satisfies the hardware requirements of the game and to determine whether the account owner has established any parental control options to preclude the user from accessing the game. The metadata also preferably identifies a game player 92 and emulator 94 that is associated with the requested game.

Unless the requested game is stored locally on the user system, the game manager 90 dispatches a request to the content manager 60 to download the game from an asset server 25. If the game uses download benchmarks, the game manager 90 may monitor the download progress, or the game manager 90 may wait for an indication from the content manager 60 the download is complete. During the download the game manager 90 may handle the download and delivery of an advertisement or other transitory content to the user. The transitory content can be specified by the metadata and/or determined by the host server 20. When the game download is complete, or in the case of a benchmarked-game when enough of the game has been downloaded to start play, the game manager 90 launches the game player 92 and emulator 94 and play begins.

An aspect of the present invention is the transparent delivery of an emulated game to a user. As illustrated in the foregoing process, the only action required by the user to initiate a game is to identify (via a mouse click or other input) a game title that the user wants to play. The game manager 90 handles the determination of which emulator 94 is required to play the selected game, and the game player 92 handles the processing required to make the appropriate emulator 92 launch the game. A preferred embodiment of the game delivery system 10 thus delivers games that were originally written for a variety of game platforms, and emulates those games on user machines using processes that are transparent to the user and are delivered to the user through a common and consistent user interface. And because the presentation of content is handled by a GUI player 82, the games delivery and emulation processes occur independently of the type of device that the user uses to access the system 10.

The following paragraphs describe how games written for a personal computer are delivered to users in a content distribution system 10. With reference to FIG. 10, a game manager 90 is shown communicating with three game players 92. A game delivery system 10 preferably includes many player 92 and emulator 94 combinations and those shown in the figure are intended to illustrate the broad range of games supported by the system. A first game player 92 is shown interfacing with a NES emulator and represents support for games that were originally written for console gaming systems. The second game player 92 interfaces with the MAME emulator and represents support for arcade games. The final game player 92 interfaces with an Exent Technologies platform and represents support for games written for personal computers (hereafter "PC games").

Whether an emulator is required to play a PC game depends on the computer platform that the game was originally intended to support and the type of device that the use uses to access the game delivery system 10. Thus, if a PC game was written to support only Macintosh computer systems, an emulator 94 is required to play the game on a computer that uses the Windows operating system, and vice versa. But in many cases PC games are written to support multiple computer platforms and these games can be delivered to users without using an emulator 94.

As illustrated in FIG. 10, the game delivery system 10 preferably supports the delivery and play of PC games. But the PC games that do not use an emulator 94 are handled a little differently than other games. Specifically, when the game delivery system 10 starts to execute a PC game, it relinquishes control over much of the user device to the PC game. This is largely unavoidable due to the fact that each PC game uses the user's computer resources in a different way.

For example, when a game delivery system 10 runs an emulated game, the game player 92 knows exactly how the emulator 94 will respond to each user action. If a user decides to save a game, the game player 92 knows where in memory the saved game information is stored and has the option to store the data locally or to store it remotely server-side. In contrast, unless a game player 92 is written to interface to a specific PC game, the game player 92 that controls the game has minimal information about the resources the game uses. In most cases, the game player 92 will not know where a PC game stores its saved game data and, as a result, cannot intercept and forward the data to a server-side storage location.

In a preferred embodiment, however, game players 92 are used to launch PC games and do monitor the user input to those games. While the game players 92 do not exert the same degree of control that is used for emulated games, the game player 92 does support some system-related functionality. Thus, for example, a game player 92 preferably retains the ability to start and stop a PC game that is being played in a game delivery system 10. Moreover, when a user leaves a PC game, the game player 92 in conjunction with the game manager 90 and other system components returns the user to a virtual user interface, and thereby provides the user with a non-disruptive, managed entertainment experience.

A preferred embodiment of the content distribution system 10, is thus a game delivery network that delivers games that were originally written for a plurality of different console, arcade and computer gaming systems. An aspect of the distribution system 10 is a user-friendly game network interface that launches an emulator 94 in response to a user selection of a game. A single click of a mouse (or other supported input device) on a title causes the corresponding game to be downloaded and launched to the user. The system 10 handles the selection of an appropriate emulator 94 for the game (if an emulator is needed) and the delivery of the game is independent of the device the user uses to access the network.

Another aspect of the system 10 is the ability to return the user to the game network interface when the user pauses or terminates a game. In known gaming systems, when a user leaves an emulation program the user is typically dropped to an operating system that controls the user's system. If a user wants to play another game, the user has to re-launch the gaming system and select a new game. In a preferred embodiment of the present invention, a user returns to the games network interface when he or she leaves a game. And while in the network interface the user has the option of returning to the game he or she just left, launching a new game or receiving and viewing the default content that is associated with the network interface. The present invention thus provides a managed gaming experience that offers a continuous delivery of entertainment content and, as a result, the content distribution system 10 is readily distinguishable from any existing game delivery system.

The entertainment content distribution system 10, which comprises an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. A game delivery system that allows a user to select from and receive delivery of at least one of a plurality of games via a network, said system comprising:
    an asset server that stores software game code associated with said plurality of games, said plurality of games comprising a first set of game software stored in a format able to be executed on one or more arcade game systems, a second set of game software stored in a format able to be executed on a video game console, and a third set of game software stored in a format able to be executed on a personal computer;
    a host server that directs said asset server to deliver one of said plurality of games to said user in response to a request from said user; and
    one or more processors residing on a user computing device associated with said user, said user computing device being remotely located from said asset server and said host server and in communication with said asset server and said host server over said network, said one or more processors configured for running a client application, and said client application configured for displaying a list of available games, accepting from said user said request to play a game selected from said list of available games, selecting an emulator from a plurality of emulators stored on said user computing device when said selected game is included in said first set or said second set of game software, and executing said selected emulator to translate said software game code, wherein said list of available games comprises at least a portion of said plurality of games stored on said asset server;
    wherein said plurality of emulators comprises:
        one or more arcade emulators for translating software game code originally written for execution by one or more arcade game systems to functionally equivalent blocks of compiled instruction set code on said user computing device, and
        one or more console emulators for translating software game code originally written for execution by one or more console game platform to functionally equivalent blocks of compiled instruction set code on said user computing device.

2. The game delivery system of claim 1, wherein said software game code comprises binary files that result from compiled source code of said plurality of games.

3. The game delivery system of claim 1, wherein said software game code is stored in an encrypted form and a decryption key is sent to said user computing device.

4. The game delivery system of claim 1, wherein said one delivered game is delivered via said network to said user computing device.

5. The game delivery system of claim 1, wherein said client application is configured to transmit said request to said host server and to receive said software game code from said asset server in response to said request.

6. The game delivery system of claim 5, wherein said client application further comprises a plurality of graphic user interface modules, wherein each of said graphic user interface modules is configured to use a different presentation logic and to interact with a different type of user computing device.

7. The game delivery system of claim 5, wherein said client application further comprises a first and second graphic user interface module, said first graphic user interface module used to deliver said requested game to a desktop personal computer, and said second graphic user module used to deliver said requested game to a handheld computing device.

8. The game delivery system of claim 5, wherein said client application further comprises a content manager that controls a download of said software game code from said asset server to said user computing device.

9. The game delivery system of claim 1, wherein said client application is configured to initiate play of said requested game from a partial download of said software game code while other portions of said software game code are simultaneously being downloaded.

10. The game delivery system of claim 1, wherein said client application is configured to reward said user for completing a predefined task.

11. The game delivery system of claim 10, wherein said client application is configured to track said rewards issued to said user and allows said user to provide indicia of said rewards to a second user.

12. The game delivery system of claim 10, wherein said client application is configured to provide said user with access to one of a new game or a new game level in response to said user completing a predefined task.

13. The game delivery system of claim 1, wherein said client application is configured to access said software game code from a local datastore residing on said user computing device.

14. The game delivery system of claim 13, wherein said local datastore comprises a plurality of secured virtual volumes.

15. The game delivery system of claim 1, wherein said client application further comprises a library of executable code that is common to said plurality of emulators.

16. The game delivery system of claim 1, wherein:
said one or more console game emulators comprises a first console game emulator for translating software game code originally written for execution by a first console game platform and a second console game emulator for translating software game code originally written for execution by a first console game platform, and
said client application includes a first game player associated with one of said one or more arcade emulators a second game player associated with said first console game emulator, and a third game player associated with said second console game emulator, said first, second, and third game players being configured to monitor a game being played via said arcade, said first console game, and second console emulators, respectively, and provide communication between said emulators and said client application.

17. The game delivery system of claim 16, wherein said game players are configured to perform a predetermined action in response to a user inputting a predefined keystroke through the user computing device during game play.

18. The game delivery system of claim 16, wherein said arcade emulator is configured to pass control of said arcade game to said first game player in response to a user inputting a command to pause or terminate said emulated arcade game, said first console emulator is configured to pass control of said first console game to said second game player response to said user inputting a command to pause or terminate said first emulated console game, and said second console emulator is configured to pass control of said second console game to said third game player response to said user inputting a command to pause or terminate said second emulated console game.

19. The game delivery system of claim 18 wherein each of said first, second, and third game players are configured to pass control of said user computing device to said client application in response to said user inputting said command to pause or terminate said emulated games.

20. The game delivery system of claim 1, further comprising a metadata datastore associated with said asset server, said metadata datastore including a data portion associated with a game, said data portion indicative of one or more operating requirements for running said game.

21. The game delivery system of claim 20, wherein said client application is configured to retrieve said data portion from said metadata datastore and to compare said data portion to a specification of said user computing device in response to said user request for said game.

22. The game delivery system of claim 1, wherein said client application is additionally configured to permit said user to select one of said available games and to forward said selected game to a location specified by said user.

23. The game delivery system of claim 1, wherein said client application is additionally configured to receive a selection of said one of said available games from said user and to deliver said selected game to a second user specified by said user.

24. A method of delivering game content to a computing device associated with a user, said method comprising:
delivering a graphical user interface that displays a list of available games and allows said user to select a game from said list;
receiving input indicative of a first game selection by said user;
choosing one emulator from a plurality of emulators to emulate a hardware configuration of a game platform for which said first selected game was written, wherein at least two emulators of said plurality of emulators are configured to emulate the hardware configuration of a different game platform, and wherein said emulator is chosen based at least in part on the game platform for which said first selected game was written;
launching said chosen emulator and initiating game play of said first selected game;
monitoring user input during said game play of said first selected game by a game player associated with said chosen emulator; and
returning said user to said graphical user interface upon identifying in said user input one of a predefined set of user inputs,
wherein said step of returning said user to said graphical user interface comprises said game player receiving said one of said predefined set of user inputs and communicating a message associated with said received input to a game manager, and said game manager communicating said message to a graphical user interface manager to return said user to said graphical user interface.

25. The method of claim 24, wherein said graphical user interface is configurable such that said user can select and initiate game play with a single click of a mouse on a game title.

26. The method of claim 25, wherein the step of launching said emulator and initiating game play occurs without requiring additional user input.

27. The method of claim 24 further comprising the step of pausing game play of said game upon identifying in said user input one of a predefined set of keystrokes from said user, said one keystroke being predefined as a game pause key.

28. The method of claim 27, further comprising the step of marking a pause point in said first selected game and saving at least one game play parameter such that said first selected game can be resumed at said pause point, said pause point reflecting a progress point in said game play.

29. The method of claim 28, further comprising the step of returning said user from said graphical user interface to said first selected game and resuming said game play of said first selected game at said pause point.

30. The method of claim 24, further comprising the steps of terminating said game play of said first selected game and allowing said user to initiate play of a second selected game.

31. The method of claim 30, further comprising the steps of:
choosing a second emulator from said plurality of emulators, said second emulator configured to emulate a hardware configuration of a game platform for which said second selected game was written;
launching said second emulator and initiating game play of said second selected game;
monitoring said user input during said game play of said second selected game by a second game player associated with said second emulator; and
taking a game delivery system related action by said second game player if said user input includes one of said predefined set of user inputs.

32. The method of claim 31, wherein said predefined set of user inputs comprise keystrokes that correspond to at least one of the game-related functions of starting, stopping, pausing or exiting from said game.

33. The method of claim 24, wherein said graphical user interface is a common interface that is manipulable by said user to access a plurality of game assets that are executable on a plurality of gaming platforms.

34. The method of claim 24, further comprising:
accessing an account associated with said user in response to said first game selection;
verifying that said account permits said user access to said first game selection; and
notifying said user if said user does not have access right to said first selected game.

35. The method of claim 34, further comprising:
offering said user an option to upgrade said account to give said user access to said first selected game.

36. The method of claim 34, further comprising:
offering said user a version of said first selected game to try on a trial basis.

37. A system for delivering game content to a user device via a network, said system comprising:
an asset server that stores a game file for a game written for a console gaming system;
a datastore that includes game metadata associated with said game file, said metadata comprising a plurality of index points that logically divide said game file into a plurality of portions, a first index point identifying a portion of said game file that is required to initiate game play of said game, and one or more subsequent index points that identify one or more additional portions of said game file; and
a processor on said user device configured for executing a client application, said client application comprising:
A. a content manager that monitors a progress of a transfer of said game file from said asset server to said user device; and
B. a game manager that manages said game play of said game on said user device;
wherein said game manager receives said metadata from said datastore and periodic updates of said game transfer progress from said content manager, and initiates said game play of said game in response to an indication that a portion of said game file identified by said first index point has been transferred successfully to said user device, wherein said game manager is configured for initiating said game play of said game prior to all portions of said game file being transferred to said user device.

38. The system of claim 37, wherein said client application is configured to allow game play as a foreground process while said content manager continues transferring an additional portion of said game file as a background process.

39. The system of claim 37, wherein said client application is configured to deliver transitional content to said user device when said game file is being transferred and before said game play has begun.

40. The system of claim 39, wherein said transitional content is identified in said metadata and is associated with said game file.

41. The system of claim 37, wherein said content manager is configured to transfer updates to a dynamic graphic user interface as a background process while said game is played as a foreground process.

42. A system for monitoring and managing game play of a plurality of games on a computer associated with a user, said system comprising:
a game manager configured for receiving a request to play a first game or a second game selected from said plurality of games by a user using said computer, said first and second games being originally adapted for execution on one or more computing devices having different hardware configurations than said computer;
a first emulator configured for translating said first selected game into a format executable on said computer and responding to user input while said first selected game is being played on said computer;
a second emulator configured for translating said second selected game into a format executable on said computer and responding to user input when said second selected game is being played on said computer;
a first game player associated with said first emulator, said first game player configured for monitoring user input while said first selected game is being played on said computer; and
a second game player associated with said second emulator, said second game player configured for monitoring user input while said second selected game is being played on said computer,
wherein said game manager is further configured for identifying said first game player and said first emulator associated with said first game in response to receiving said request to play said first game and identifying said second game player and said second emulator associated with said second game in response to receiving said request to play said second game,
wherein said first game player is further configured for obtaining and passing control of said first game to said game manager in response to receiving a particular input from said user while said first selected game is being played, said particular input being included on a list of predetermined user inputs, and
wherein said second game player is further configured for obtaining and passing control of said second game to said game manager in response to receiving a particular input from said user while said second selected game is being played, said particular input being included on said list of predetermined user inputs.

43. The system of claim 42 wherein:
said first emulator is further configured for taking one or more game play-related actions in response to user input while said first selected game is being played when said user input is not included on said list of predetermined user inputs, and
said second emulator is further configured for taking one or more game play-related actions in response to user input while said second selected game is being played when said user input is not included on said list of predetermined user inputs.

44. The system of claim 43 wherein:
said first game player is further configured for taking one or more system-related actions in response to receiving said particular input while said first selected game is being played, said particular input being included on said list of predetermined user inputs, and
said second game player is further configured for taking one or more system-related actions in response to receiving said particular input while said second selected game is being played, said particular input being included on said list of predetermined user inputs.

45. The system of claim 44 wherein said list of predetermined user inputs comprises a key associated with pausing game play of said first game or said second game.

46. The system of claim 45 wherein:
said request is a first request,
said game manager is further configured for:
  receiving a second request to play a third game selected from said plurality of games by said user using said computer while said first game or said second game is paused, said third game being originally adapted for execution on one or more computing devices having different hardware configurations than said computer and said computing device for which said first game or said second game was originally adapted; and
  identifying a third game player and a third emulator associated with said third game in response to said third game being selected by said user; and said third game player is configured for:
  monitoring user input while said third selected game is being played, and
  obtaining and passing control of said third game to said game manager in response to receiving a particular input from said user while said third selected game is being played, said particular input being included on said list of predetermined user inputs.

47. The system of claim 46 wherein said game manager is further configured for allowing said user to resume play of said paused game after pausing or terminating game play of said third game.

48. The system of claim 42 wherein said first game player is configured for launching said first emulator and said second game player is configured for launching said second emulator.

49. The system of claim 48 wherein said first game player is configured for initiating game play of said first selected game, and said second game player is configured for initiating game play of said second selected game.

50. The system of claim 42 wherein:
said first game player is further configured for allowing said first emulator to respond to user input while said first selected game is being played on said computer when said user input does match not user inputs included on said list of predetermined user inputs, and
said second game player is further configured for allowing said second emulator to respond to user input while said second selected game is being played on said computer when said user input does not match user inputs included on a list of predetermined user inputs.

* * * * *